United States Patent [19]

Karashima

[11] Patent Number: 6,095,348

[45] Date of Patent: Aug. 1, 2000

[54] SUPERMARKET GOODS DISPLAY RACK AND CART THEREFOR

[76] Inventor: Masashi Karashima, 88-5, Nakano, Ebina-shi, Kanagawa-ken, Japan

[21] Appl. No.: 09/058,847

[22] Filed: Apr. 13, 1998

[30] Foreign Application Priority Data

Oct. 15, 1997 [JP] Japan .................................. 9-281598

[51] Int. Cl.$^7$ .................................................. A47F 5/00
[52] U.S. Cl. ........................................ 211/175; 280/79.3
[58] Field of Search ................................ 280/79.11, 79.3, 280/47.34, 47.35, 504, 508; 211/175, 186, 189, 153; 213/75 TC, 75 R, 88, 182, 175, 178, 188

[56] References Cited

U.S. PATENT DOCUMENTS

| | | | |
|---|---|---|---|
| 2,798,617 | 7/1957 | Schreiber | 211/137 |
| 3,031,207 | 4/1962 | Bard | 280/47.34 |
| 3,082,876 | 3/1963 | Cranmore | 211/153 X |
| 3,137,250 | 6/1964 | Hutchinson | 280/47.34 |
| 3,199,469 | 8/1965 | Sullivan | 108/53 |
| 3,640,389 | 2/1972 | Snyder | 211/153 |
| 3,920,259 | 11/1975 | Graham | 280/47.34 |
| 4,104,973 | 8/1978 | Dwyer | 108/59 |
| 4,222,181 | 9/1980 | Cummings | 35/73 |
| 4,313,612 | 2/1982 | Rubens | 280/79.11 |
| 4,765,496 | 8/1988 | Diller | 213/75 TC |
| 4,806,072 | 2/1989 | Karashima . | |
| 4,919,280 | 4/1990 | Phillips | 211/187 |
| 4,928,833 | 5/1990 | Huizenga | 211/187 |
| 5,027,959 | 7/1991 | Luukkonen | 211/186 |
| 5,240,127 | 8/1993 | Levin et al. | 211/186 |
| 5,280,933 | 1/1994 | Finneyfrock | 280/47.34 |
| 5,313,891 | 5/1994 | Suttles | 211/186 |
| 5,350,077 | 9/1994 | Nezu et al. | 213/75 R |
| 5,378,003 | 1/1995 | Burd et al. | 280/79.11 |
| 5,484,150 | 1/1996 | Yasutomi | 280/79.3 |
| 5,529,323 | 6/1996 | Vom Braucke et al. | 280/87.01 |
| 5,556,118 | 9/1996 | Kern et al. | 280/79.11 |
| 5,599,031 | 2/1997 | Hodges | 280/79.11 |
| 5,653,458 | 8/1997 | Chaparian | 280/47.34 |
| 5,752,610 | 5/1998 | Remmers | 211/186 |
| 5,829,765 | 11/1998 | Snider | 280/47.34 |
| 5,853,181 | 12/1998 | Booras | 280/47.35 |

FOREIGN PATENT DOCUMENTS

| | | |
|---|---|---|
| 2127939A | 1/1995 | Canada . |
| 29702861 U1 | 8/1997 | Germany . |
| 19612015A1 | 9/1997 | Germany . |
| 507496A | 5/1976 | U.S.S.R. . |
| 1705196A1 | 1/1992 | U.S.S.R. . |
| 1267630 | 3/1972 | United Kingdom . |
| 2 263 627 | 8/1993 | United Kingdom . |
| 2 280 166 | 1/1995 | United Kingdom . |

OTHER PUBLICATIONS

WO 96/20859, Abstract—Jul. 11, 1996, related to AU 9646118.

*Primary Examiner*—Daniel P. Stodola
*Assistant Examiner*—Jennifer E. Novosad
*Attorney, Agent, or Firm*—Wenderoth, Lind & Ponack, L.L.P.

[57] ABSTRACT

A supermarket goods display rack and display carts therefor with each cart having a cart body with upper and lower faces, defining four corners and having casters fitted to each corner and to the central portion of the lower face. Each cart body also having an upper edge potion including a jointing member which defines a jointing hook and a lower edge portion including a jointing member which defines a jointing hole, so that the jointing members connect when the carts are laterally joined. A passage ($a_1$) is formed within a base portion of a goods display rack (a). A goods display cart (1) is placed into the passage, the cart displaying thereon a plurality of goods ($j_2$) in a direction from a front side toward a rear side of the base portion. When the goods on the front side of the base portion on the cart are sold out, the cart is drawn out of the passage of the base portion, the cart having remaining goods thereon. The cart is then turned around and returned into the passage, thereby changing the goods remaining on the cart from the rear side to the front side of the base portion. The method may also include placing new goods on the front side of the goods remaining on the cart before turning the cart around and returning the cart into the passage to add new goods on the rear side of the base portion.

8 Claims, 28 Drawing Sheets

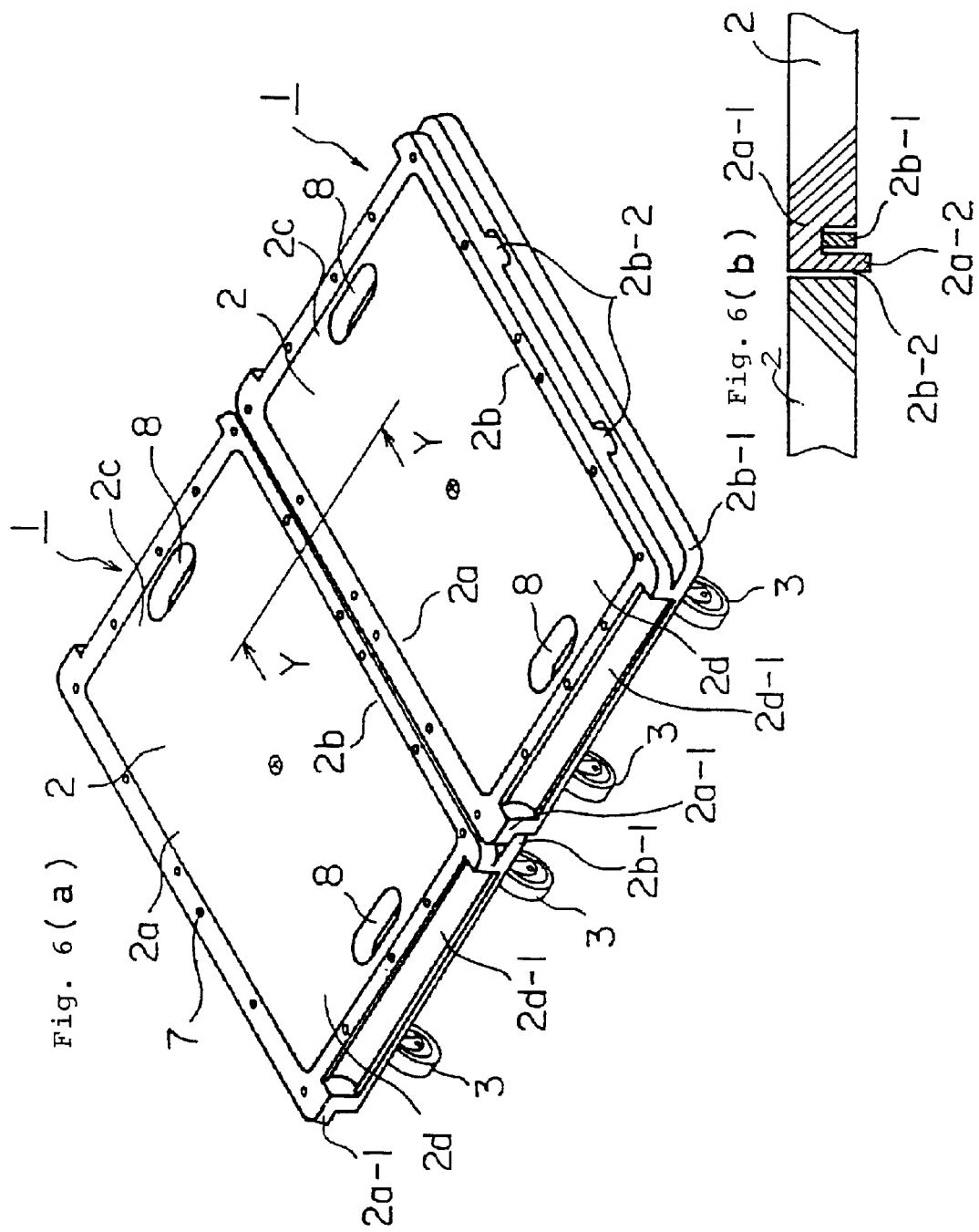

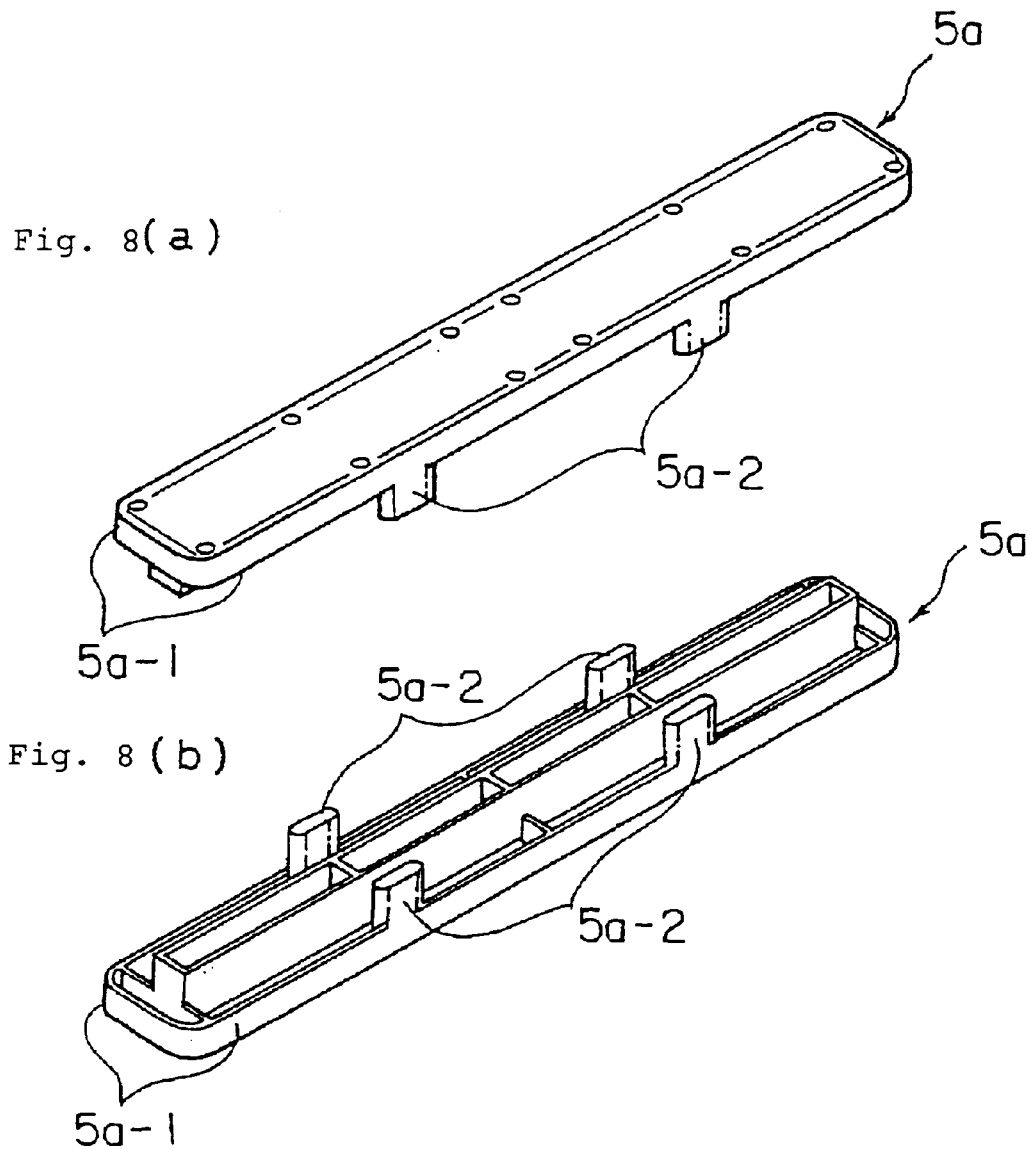

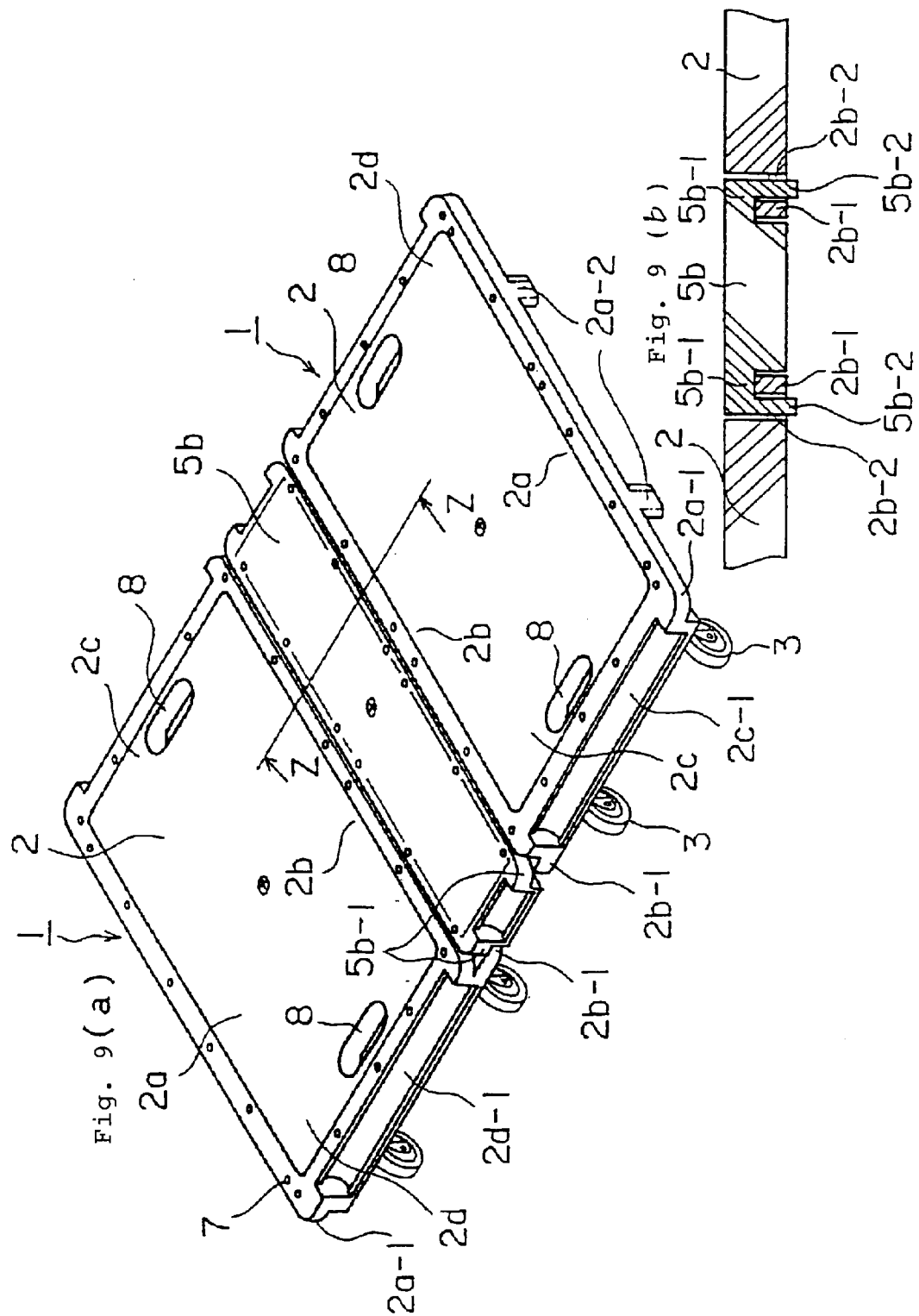

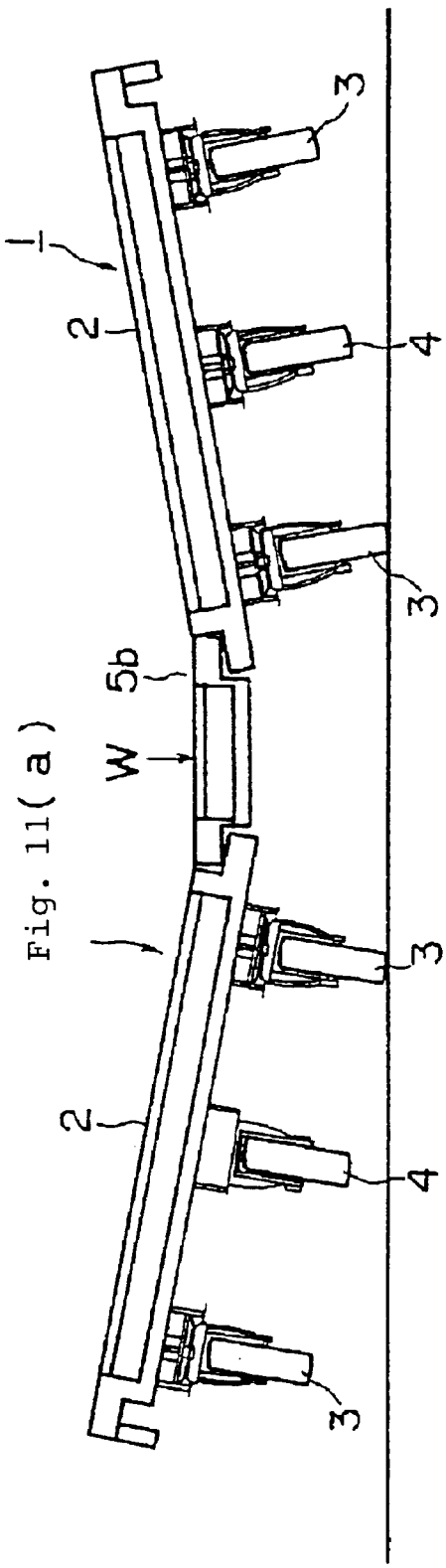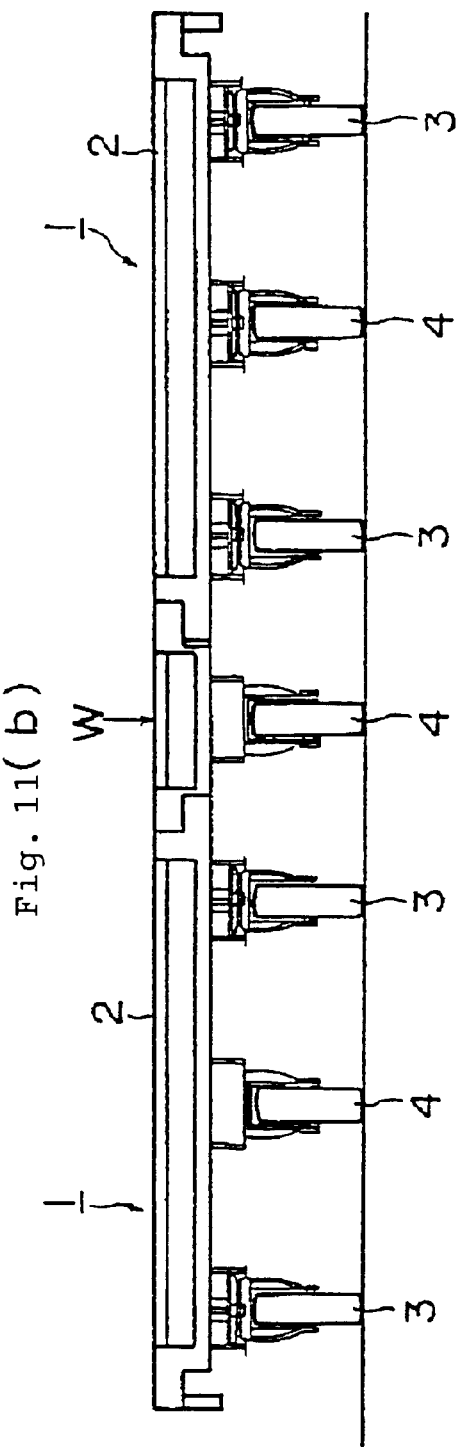

a₁ Passage j₂ Goods displayed on the base portion

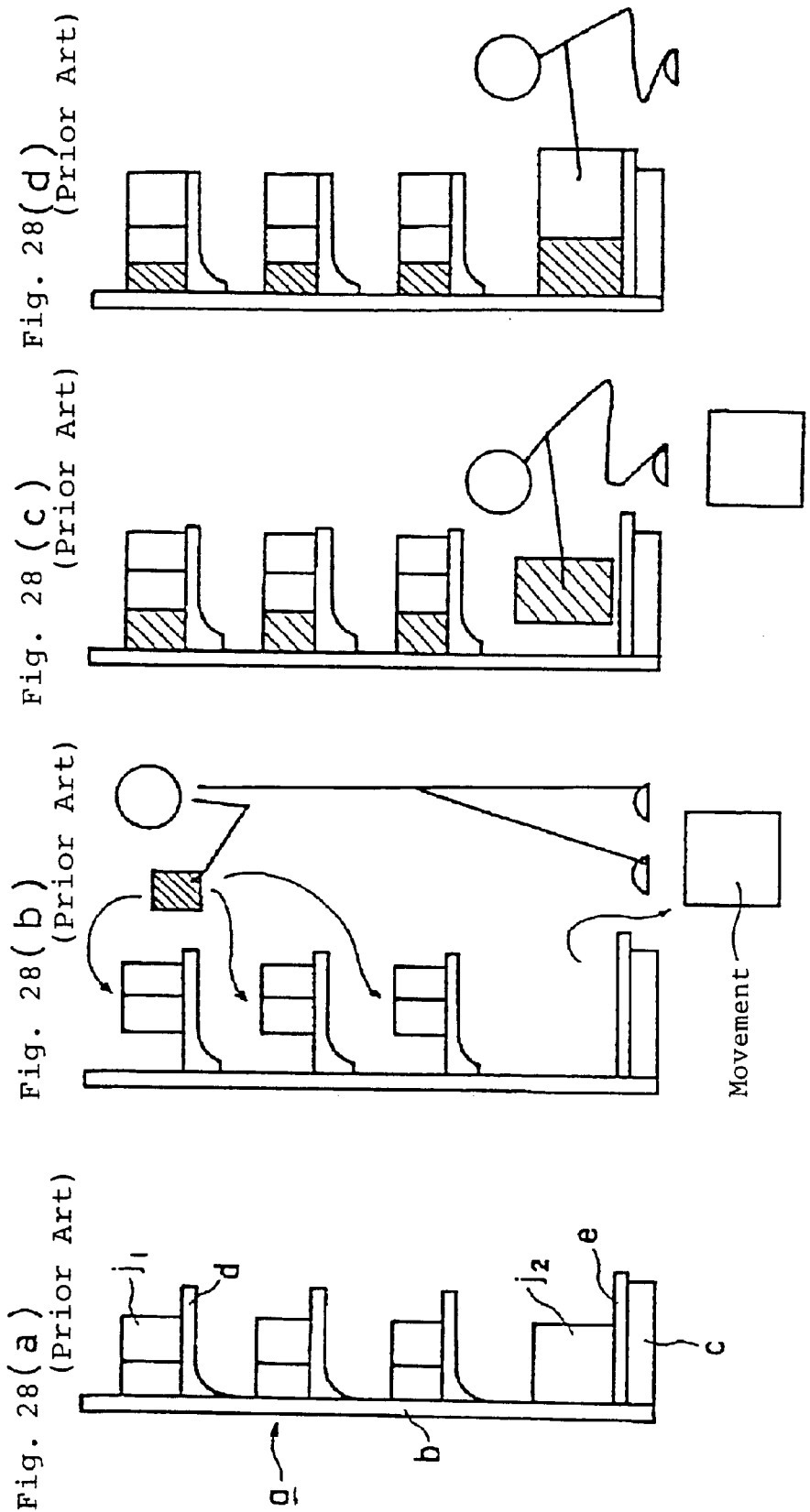

SUPERMARKET GOODS DISPLAY RACK AND CART THEREFOR

BACKGROUND OF THE INVENTION

1. Field of the Invention

The present invention relates to a goods display method, a goods display rack and a goods display cart therefor to be used in a supermarket.

2. Description of the Prior Art

A prior art goods display rack used in a supermarket will be described with reference to FIGS. 26 to 28. Reference letter "a" designates a goods display rack. A plurality of the goods display racks a are jointed in line together to form an elongate display space.

Reference letter "b" designates a pole of each goods display rack a, "c" designates a leg portion of the pole b, "d" designates upper and lower multi-stage shelf plates supported by upper and lower multi-stage arms fitted detachably to the pole b, "e" designates a lowermost base plate supported by the leg portion c of the pole b, "f" designates a pole cap fitted to the upper end of the pole b, "g" designates a back plate for closing a back side of the goods display rack a, "h" designates a price label rail for fitting price labels showing goods names, prices, etc. provided to a front end face of each shelf plate d and the base plate e, "i" designates a front end plate fitted to a front end of the leg portion c, "$j_1$" designates goods placed on each shelf plate d and "$j_2$" designates goods placed on the base plate e.

On each shelf plate d, the goods $j_1$ are displayed from a front side toward a rear side in the depthwise direction, and on the base plate e, the goods $j_2$ are displayed from a front side toward a rear side in the depthwise direction. When the goods on the front side are sold out and a blank space occurs there, the goods on the rear side are moved to the front side to fill the blank space and new goods are supplemented on the rear side.

The goods supplementing work on each shelf plate d will be described further. As shown in FIGS. 28(*a*) and (*b*), when the goods $j_1$ on the front side are sold out and a blank space occurs there, the goods $j_1$ on the rear side are moved to the front side to fill the blank space and new goods $j_1$ are supplemented on the rear side. This work is done by a worker who is standing in a natural posture.

The goods supplementing work on the base plate e will be described further with reference to FIG. 28. When the goods $j_2$ on the front side are sold out and a blank space occurs on the front side of the base plate e [FIG. 28(*a*)], then the goods $j_2$ remaining on the rear side are once taken out of the base plate e [FIG. 28(*b*)], new goods $j_2$ are supplemented onto a blank space on the rear side of the shelf [FIG. 28(*c*)], and then the goods $j_2$ once placed outside of the base plate e are returned onto the front side of the base plate e [FIG. 28(*d*)]. This work is done by a worker who is bending forward or kneeling down in a rigid posture.

The goods supplementing work on each shelf plate d and the base plate e is done very often in daily work.

The shelf plate d is provided at a relatively high position and when the goods $j_1$ are to be supplemented on the shelf plate d, the worker may do the goods supplementing work efficiently in a natural standing posture without the need to assume a rigid posture. But the base plate e is at a low position of 11 to 20 cm up from the floor surface, and moreover there is the shelf plate d immediately above the base plate e, hence the worker is forced to assume such a rigid posture as bending forward or kneeling down.

For this reason, as to the base plate e, not complying with an ironbound rule of goods supplementing work, that is: "Move the remaining goods forward and supplement new goods backward!", the worker is easily inclined to supplement new goods $j_2$ to the front side of the base plate e while the goods $j_2$ remain on the rear side of the shelf, with the that the goods $j_2$ are kept remaining on the rear side for a long time. This has been long pointed out as occurring fatally in the display and supplement of goods on the base portion of the lowermost stage.

Also, as to the base portion of the goods display rack in a supermarket, there has been a recent tendency of the mode of display changing from that in which a large number of the same articles are directly placed and displayed on the base plate e, to that in which a large number of the same articles as packed in a package, are displayed on the base plate e. Thus the weight handled at one time is increased with the result that the work efficiency is lowered as a larger part of the workers in the supermarket are part time women.

SUMMARY OF THE INVENTION

In view of the above-mentioned problems in the prior art, it is an object of the present invention to provide a goods display method and a goods display rack and a goods display cart therefor to be used in a supermarket whereby a changing work of the goods from the base portion rear side to the base portion front side can be done easily, even by women workers.

It is a feature of the present invention to provide a supermarket goods display method, comprising forming a passage within a base portion of a goods display rack, placing a goods display cart into the passage, the cart displaying thereon a plurality of goods in a direction from a front side toward a rear side of the base portion, when the goods on the front side of the base portion on the cart are sold out, drawing the cart out of the passage of the base portion with the cart having remaining goods thereon; turning the cart around; and returning the cart into the passage, thereby changing the goods remaining on the cart from the rear side to the front side of the base portion.

It is another feature of the present invention to provide a supermarket goods display method, comprising forming a passage within a base portion of a goods display rack, placing a goods display cart into the passage, the cart displaying thereon a plurality of goods in a direction from a front side toward a rear side of the base portion, when the goods on the front side of the base portion on the cart are sold out, drawing the cart out of the passage of the base portion with the remaining goods thereon, placing new goods on the front side of the goods remaining on the cart, turning the cart around and returning the cart into the passage, thereby changing the goods remaining on the cart from the rear side to the front side of the base portion as well as supplementing new goods on the rear side of the base portion.

In order to attain the object, it is also a feature of the present invention to provide a supermarket goods display rack device; comprising: a goods display shelf forming a blank space at its base portion and a goods display cart that may be carried in to or out to or from the blank space. The above-mentioned goods display method according to the present invention can thereby be practiced more effectively.

Also, it is a feature of the present invention to provide a goods display cart having a bedplate-like cart body for carrying goods thereon, comprising a caster fitted to a lower face of each corner portion of the cart body and an auxiliary caster fitted to a lower face of a central portion of the cart body.

It is a further feature of the present invention to provide a goods display cart in which the cart body has a price label rail at its front and rear portion, respectively, the price label rail being formed of a synthetic resin material integral with the cart body.

It is a further feature of the present invention to provide a goods display cart, which further comprises jointing members of plural kinds having different widths, each jointing member having a jointing hook on each side, and in which the cart body has an upper edge portion projecting sidewards from its one side upper portion and a jointing hook provided to a lower face of the upper edge portion as well as a lower edge portion projecting sidewardly from its other side lower portion and a jointing hole formed in the lower edge portion.

In the above-mentioned goods display cart according to the present invention, the jointing member preferably has an auxiliary caster fitted to a lower face of a central portion.

In the above-mentioned goods display cart according to the present invention, the jointing member preferably has a price label rail at its front and rear portions, respectively, the price label rail being formed of a synthetic resin material integrally with the jointing member.

The above-mentioned goods display cart according to the present invention may further comprise a goods overturn preventing member that engages detachably with an engaging hole provided in an outer peripheral portion of the cart body.

BRIEF DESCRIPTION OF THE DRAWINGS:

FIG. 6(a) is a perspective view showing a state where two carts are jointed together sidewards, and FIG. 6(b) is a cross sectional view taken along line Y—Y of FIG. 6(a).

FIG. 8(a) is a perspective view showing the narrow jointing member, and FIG. 8(b) is a perspective view showing the same as seen from a backside thereof.

FIG. 9(a) is a perspective view showing a state where two carts are jointed together sidewards with a wider jointing member interposed therebetween, and FIG. 9(b) is a cross sectional view taken along line Z—Z of FIG. 9(a).

FIG. 11(a) is a front view showing a case where carts on both sides incline as the jointing member has no auxiliary caster, and FIG. 11(b) is a front view showing a case where the carts on both sides are properly maintained as the jointing member has an auxiliary caster.

FIG. 21 is a perspective view showing a state where all the goods have been sold out and a goods supplementing work is being waited for.

FIGS. 28(a), (b), (c) and (d) are explanatory views of work done on the prior art supermarket goods display rack.

DESCRIPTION OF THE PREFERRED EMBODIMENTS

A goods display method and a goods display rack and a goods display cart therefor to be used in a supermarket according to the present invention will be described by use of embodiments shown in FIGS. 1 to 25 as follows.

Figure 1:
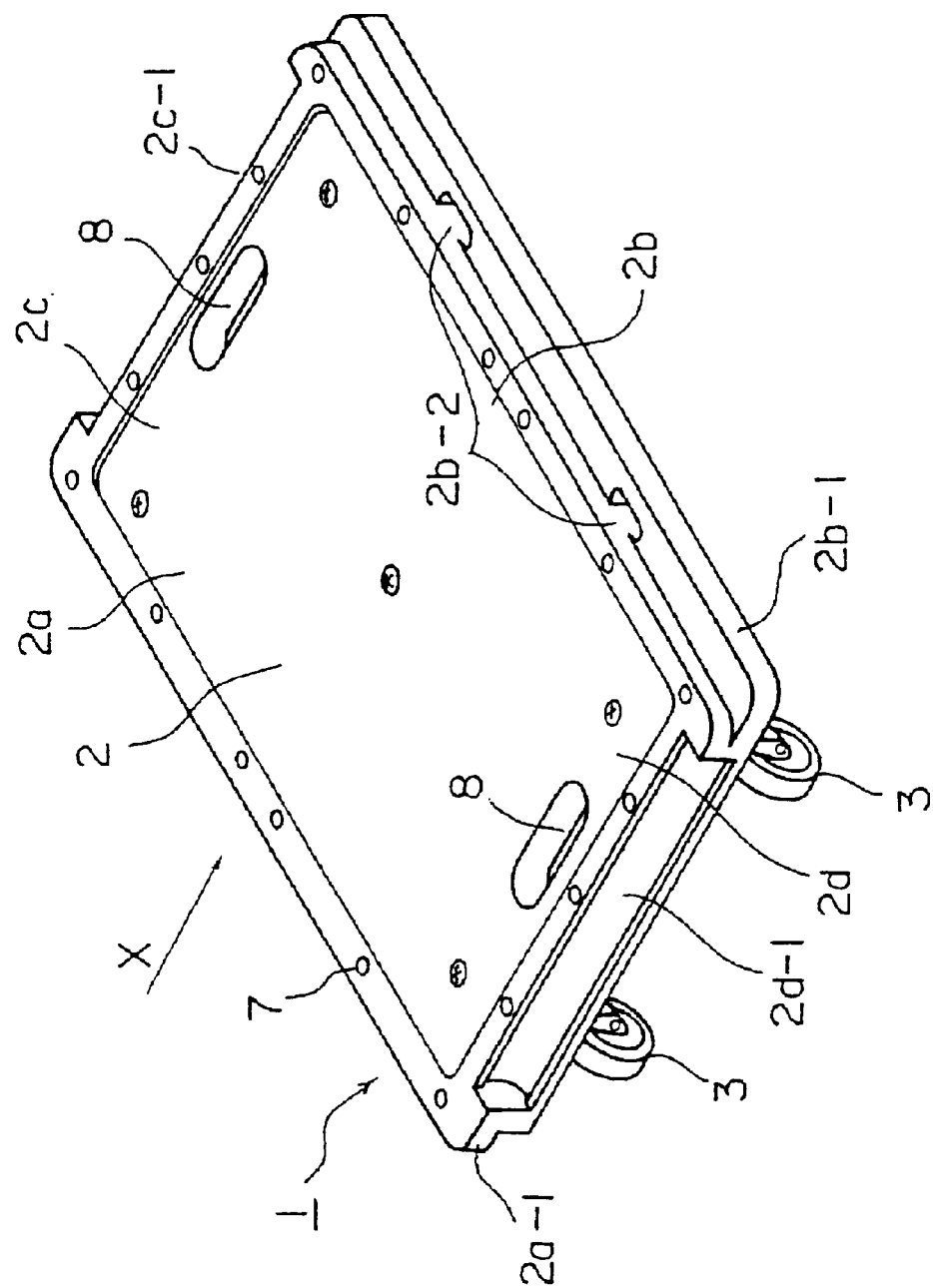
FIG. 1 is a perspective view showing one embodiment of a goods display cart according to the present invention.
Figure 2:
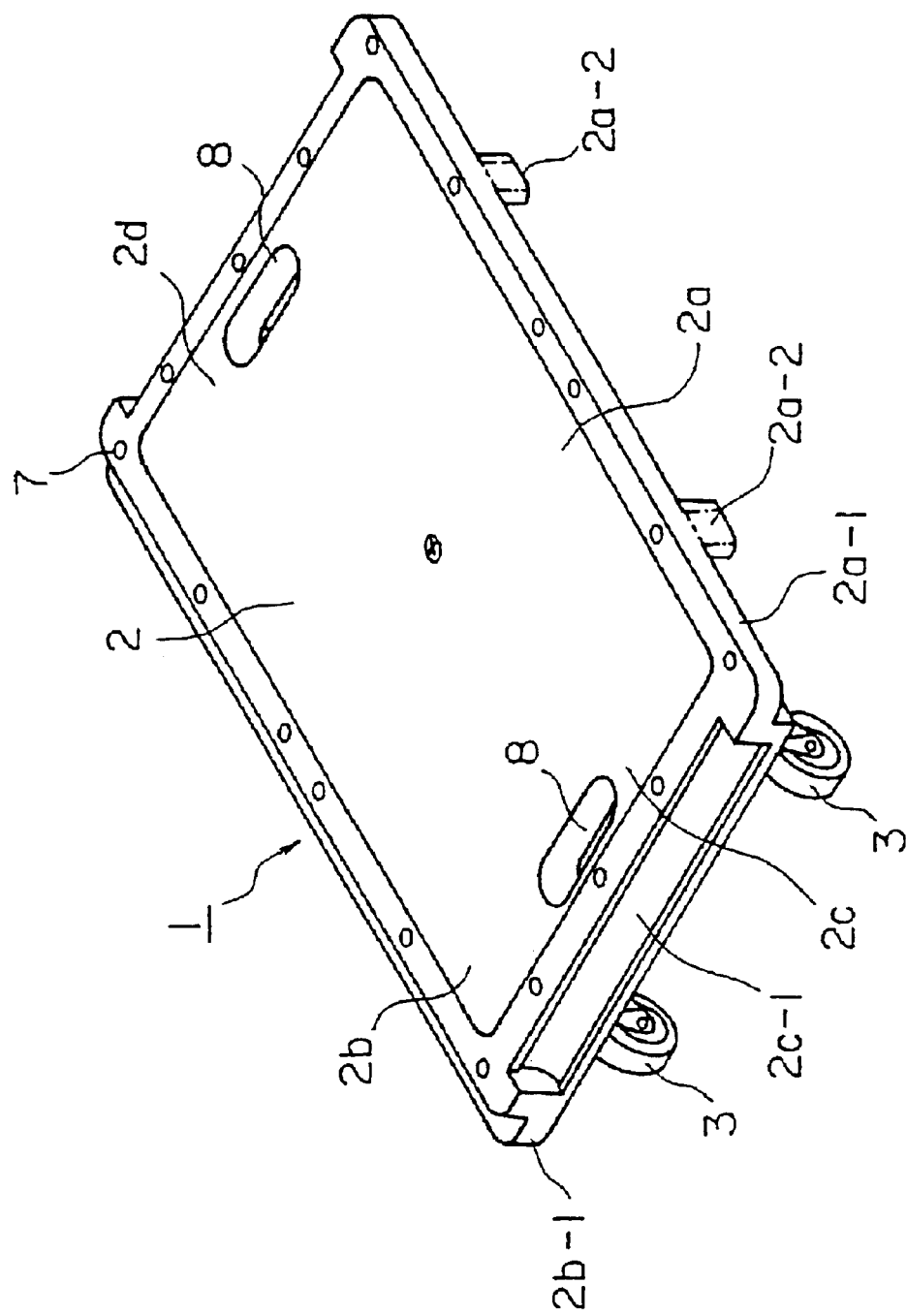
FIG. 2 is a perspective view of the goods display cart seen from an arrow X direction of FIG. 1.
Figure 3:
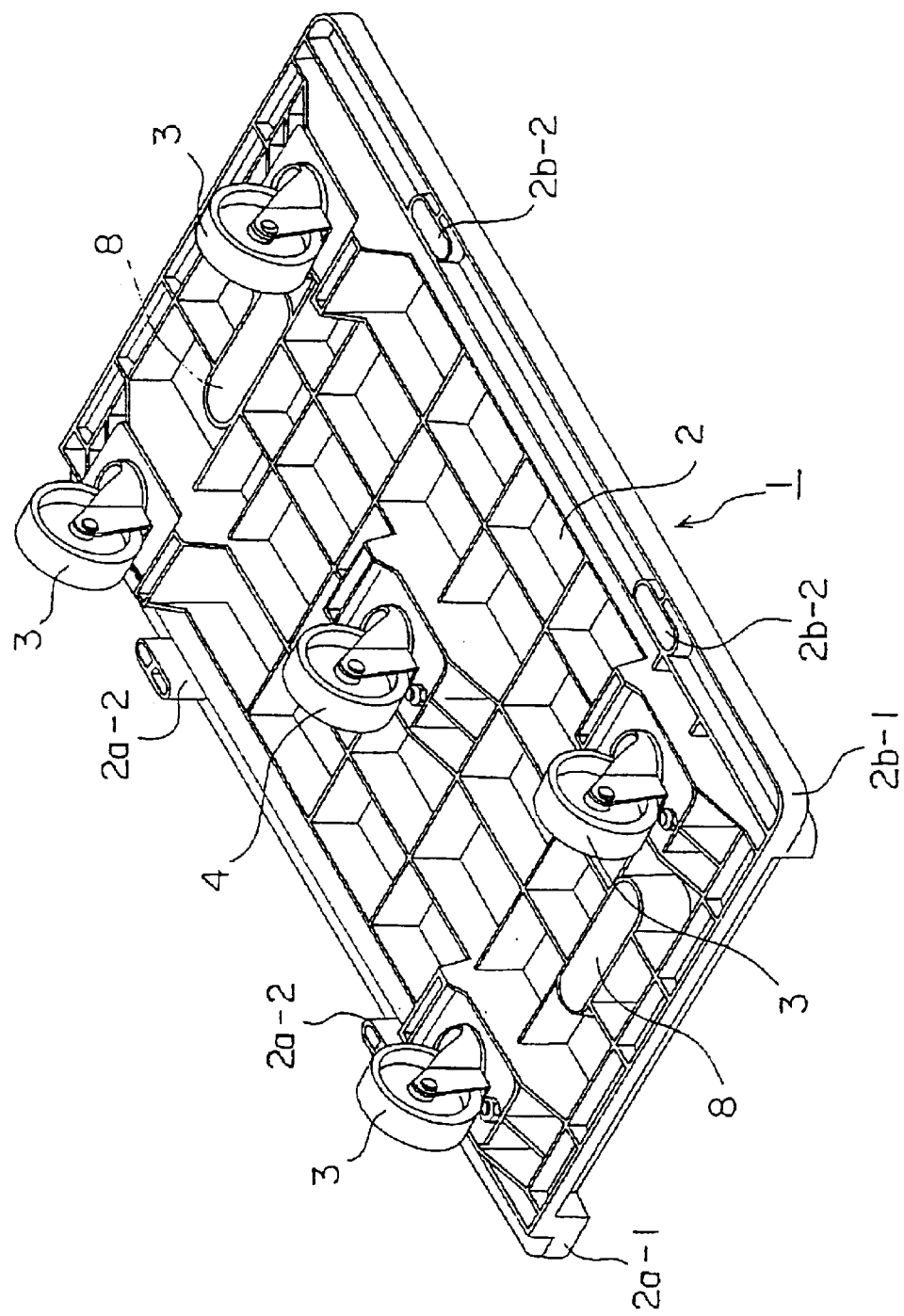
FIG. 3 is a perspective view of the goods display cart seen from a backside thereof.

In FIGS. 1 to 3, numeral designates a goods display cart and numeral 2 designates a bedplate-like cart body made of plastics. In FIG. 1, numeral 2a designates a cart one side portion, numeral 2b designates a cart other side portion, numeral 2c designates a cart front portion and numeral 2d designates a cart rear portion. An upper edge portion 2a-1 is provided projecting outwardly from a side face of the cart one side portion 2a and a jointing hook 2a-2 is provided to a lower face of the upper edge portion 2a-1 as shown in FIG. 2. A lower edge portion 2b-1 is provided projecting outwardly from a side face of the cart other side portion 2b and a jointing hole 2b-2 is formed in the lower edge portion 2b-1 as shown in FIG. 1. Incidentally, numeral 8 designates a handle hole.

Numeral 2d-1 in FIG. 1 designates a price label rail on the cart rear portion 2d side and numeral 2c-1 in FIG. 2 designates a price label rail on the cart front portion 2c side. The price label rails 2c-1, 2d-1 are formed of plastics integrally with the cart body 2.

Figure 4:
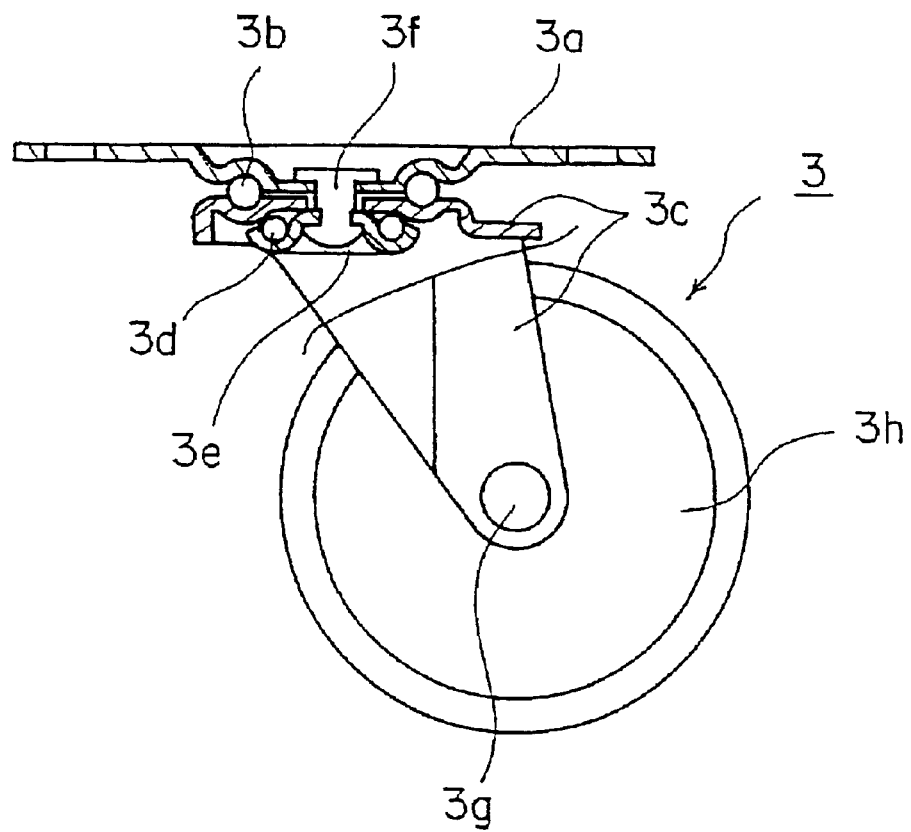
FIG. 4 is a longitudinal cross sectional view showing one example of a caster.

Numeral 3 in FIGS. 1 to 3 designates a caster fitted to a lower face of each of the corner portions of the cart body 2. The caster 3 is constructed as shown in FIG. 4. That is, a plate 3a is fixed to a lower face of the cart body 2, and an upper bearing 3b is interposed between a central plate portion of the plate 3a and an upper end plate portion of a yoke 3c. A lower bearing 3d is interposed between the upper end plate portion of the yoke 3c and a lower plate 3e. The lower plate 3e is riveted to the central plate portion of the plate 3a via a rivet 3f (a vertical slewing spindle) so that the yoke 3c slews horizontally around the axis of the rivet 3f. Also, a wheel 3h is rotatably to a lower end portion of the yoke 3c via an axle 3g.

Numeral 4 in FIG. 3 designates an auxiliary caster which is same as the caster 3 in the construction and is fitted to a lower face of a central portion of the cart body 2.

Figure 5A:
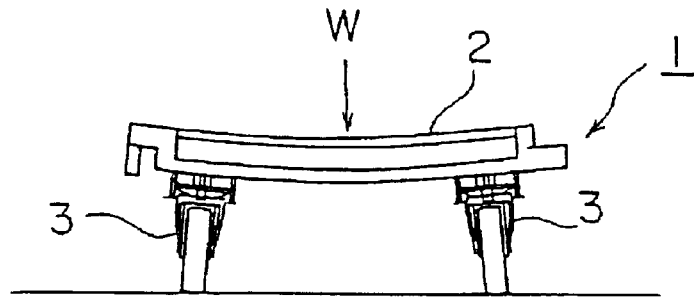
FIGS. 5(a) and (b) are a front view and a side view, respectively, showing a case where deformation occurs in a cart body, as it has no auxiliary caster, and FIGS. 5(c) and (d) are a front view and a side view, respectively, showing a case where there no deformation occurs of the cart body, as it has an auxiliary caster.
Figure 5B:
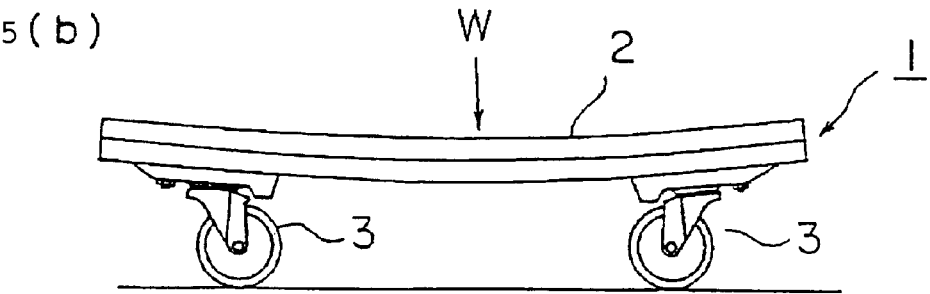
Figure 5C:
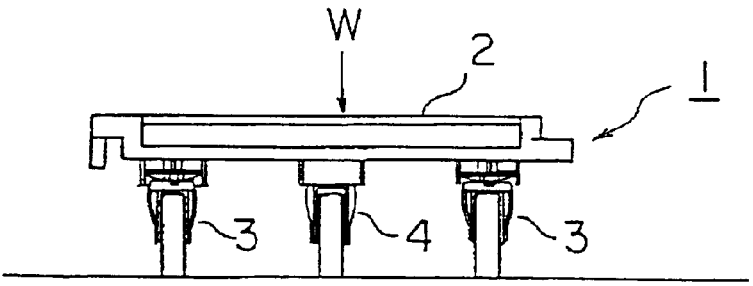
Figure 5D:
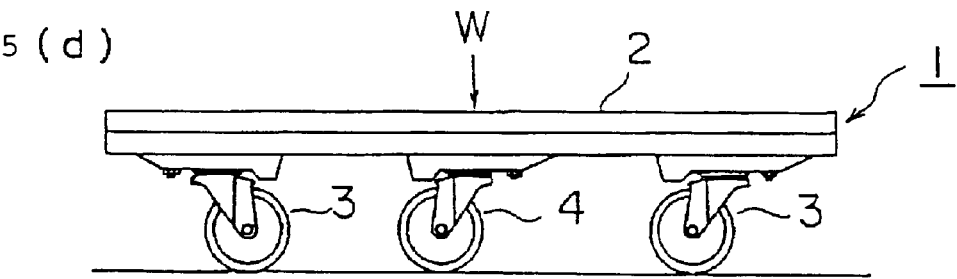

FIGS. 5(a) and (b) show a case where no auxiliary caster 4 is fitted to the cart body 2 and FIGS. 5(c) and (d) show a case where the auxiliary caster 4 is fitted to the cart body 2. If the cart body 2 is provided with no auxiliary caster 4 and is loaded with a large load W by a large number of goods in an overlapped state or by weighty goods, it will bend as shown in FIGS. 5(a) and (b). Accompanying therewith, the rivet 3f (vertical slewing spindle) inclines relative to a floor face, with the result that the goods display cart 1 will lose its smooth movement. The auxiliary caster 4 fitted to the lower face of the central portion of the cart body 2 maintains the state of the cart body 2 as shown in FIGS. 5(c) and (d).

FIGS. 6(a) and (b) show a case where two carts 1 are directly jointed together sideways. The jointing is made such that the upper edge portion 2a-1 of one cart 1 is placed onto the lower edge portion 2b-1 of the other cart 1 so that the jointing hook 2a-2 of the upper edge portion 2a-1 engages with the jointing hole 2b-2 of the lower edge portion 2b-1, with result that a goods supporting face of each cart is on the same level.

Figure 7:
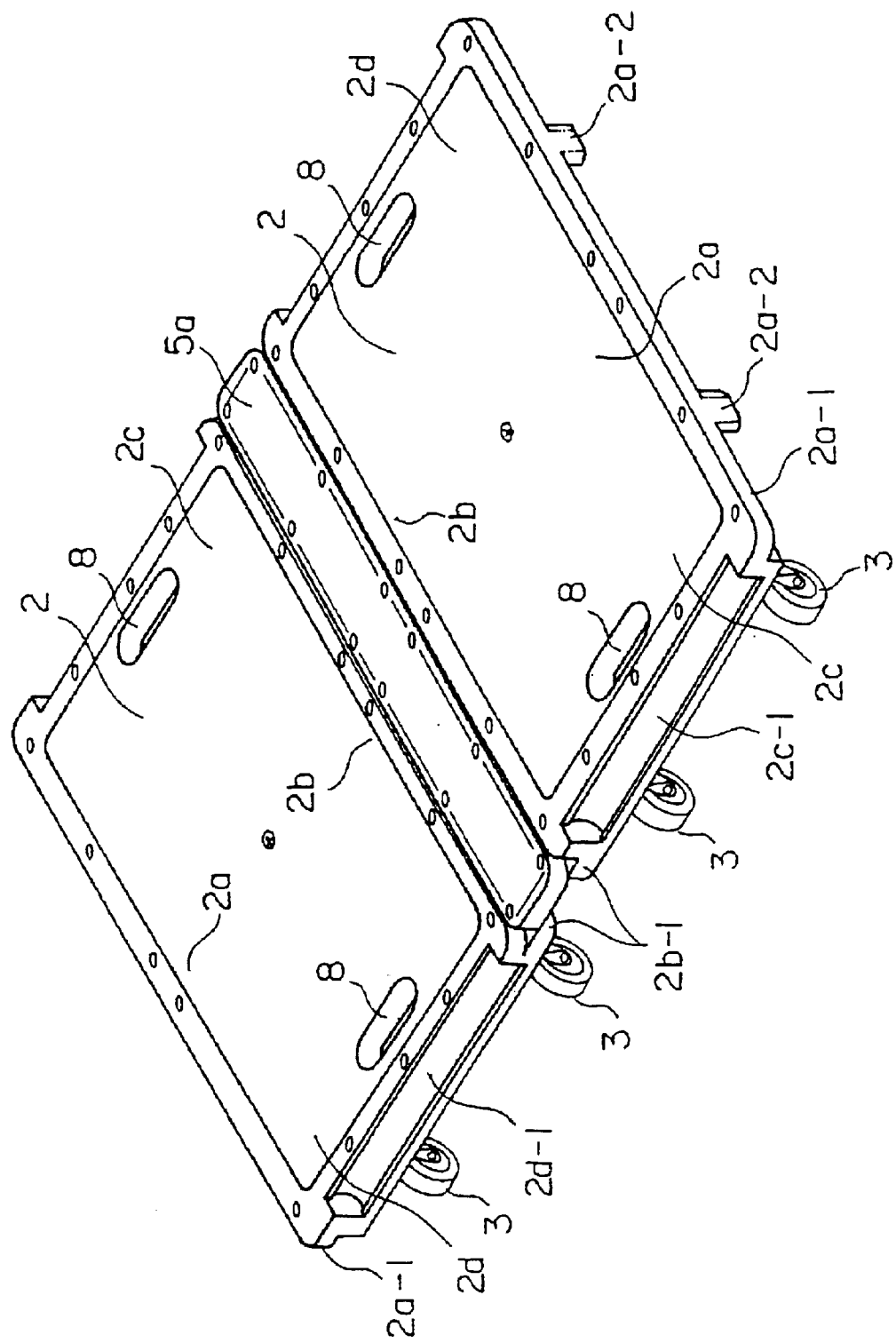
FIG. 7 is a perspective view showing a state where two carts are jointed together sidewards with a narrow jointing member interposed therebetween.

FIGS. 7 and 8 show a case where two carts 1 are jointed together sideways via a narrow jointing member 5a. Numeral 5a-1 designates a side portion of the jointing member 5a and a jointing hook 5a-2 is provided projecting from a lower face of each of the side portions 5a-1 of the jointing member 5a. The jointing is made such that both side portions 5a-1 of the jointing member 5a are placed on the lower edge portion 2b-1 of each cart 1 so that each jointing hook 5a-2 of the jointing member 5a engages with each jointing hole 2b-2 of each lower edge portion 2b-1, with the result that the goods supporting faces of each cart 1 and the jointing member 5a are on the same level.

Figures 10A, 10B:
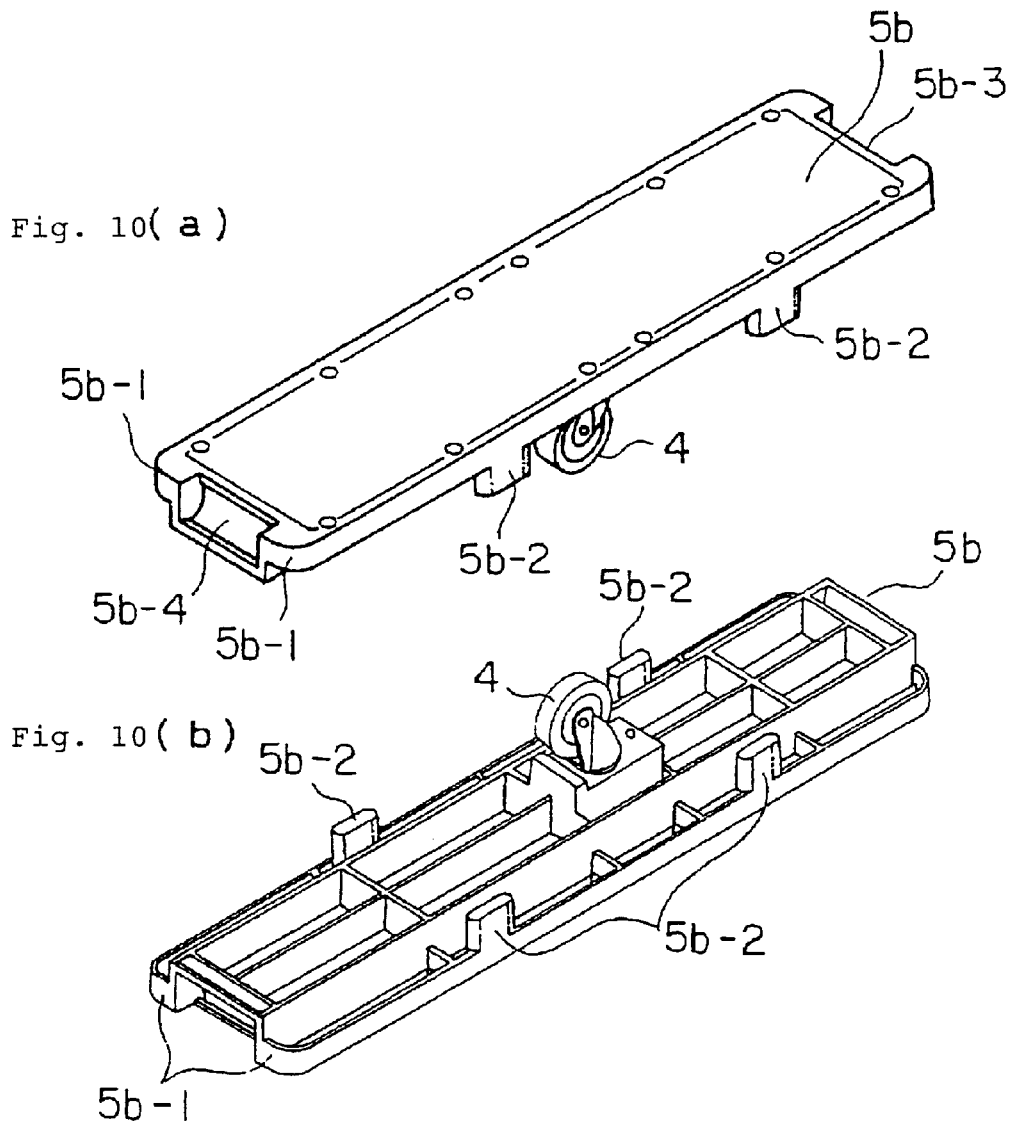
FIG. 10(a) is a perspective view showing the wider jointing member and FIG. 10(b) is a perspective view showing the same as seen from a backside thereof.

FIGS. 9 and 10 show a case where two carts 1 are jointed together sideways via a wider jointing member 5b. Numeral 5b-1 designates an upper edge portion projecting sidewardly from a side of the jointing member 5b, numeral 5b-2 designates a jointing hook provided to a lower face of the upper edge portion 5b-1, and numerals 5b-3, 5b-4 each designates a price label rail provided at a front and a rear end portion, respectively, of the jointing member 5b. The price label rails are formed of plastics integrally with the jointing member 5b. An auxiliary caster 4 is fitted to a lower face of a central portion of the jointing member 5.

The jointing is made such that both side portions 5b-1 of the jointing member 5b are placed on the lower edge portion 2b-I of each cart 1 so that each jointing hook 5b-2 of the jointing member 5b engages with each jointing hole 2b-2 of each lower edge portion 2b-1, with the result that the goods supporting faces of each cart 1 and the jointing member 5bare on the same level.

FIG. 11(a) shows a case where no auxiliary caster 4 is fitted to the jointing member 5b and FIG. 11(b) shows a case where the auxiliary caster 4 is fitted to the jointing member 5b.

If two carts 1 jointed together via the jointing member 5b are loaded with a large load W by a large number of goods in an overlapped state or by weighty goods, the jointing member 5b is pushed down and the jointed portion side of each cart 1 is also pushed down. Thus, each cart 1 inclines around a fulcrum of the caster 3 on the side of the jointing member 5b as shown in FIG. 11(a) and the rivet 3f (vertical slewing spindle) of each caster 3 inclines relative to the floor face, and hence the goods display cart 1 will lose its smooth movement. The auxiliary caster 4 fitted to the lower face of the central portion of the jointing member 5b prevents the jointing member 5b from moving down and maintains the state of each cart 1 and the jointing member 5b as shown in FIG. 11(b).

Figure 12:
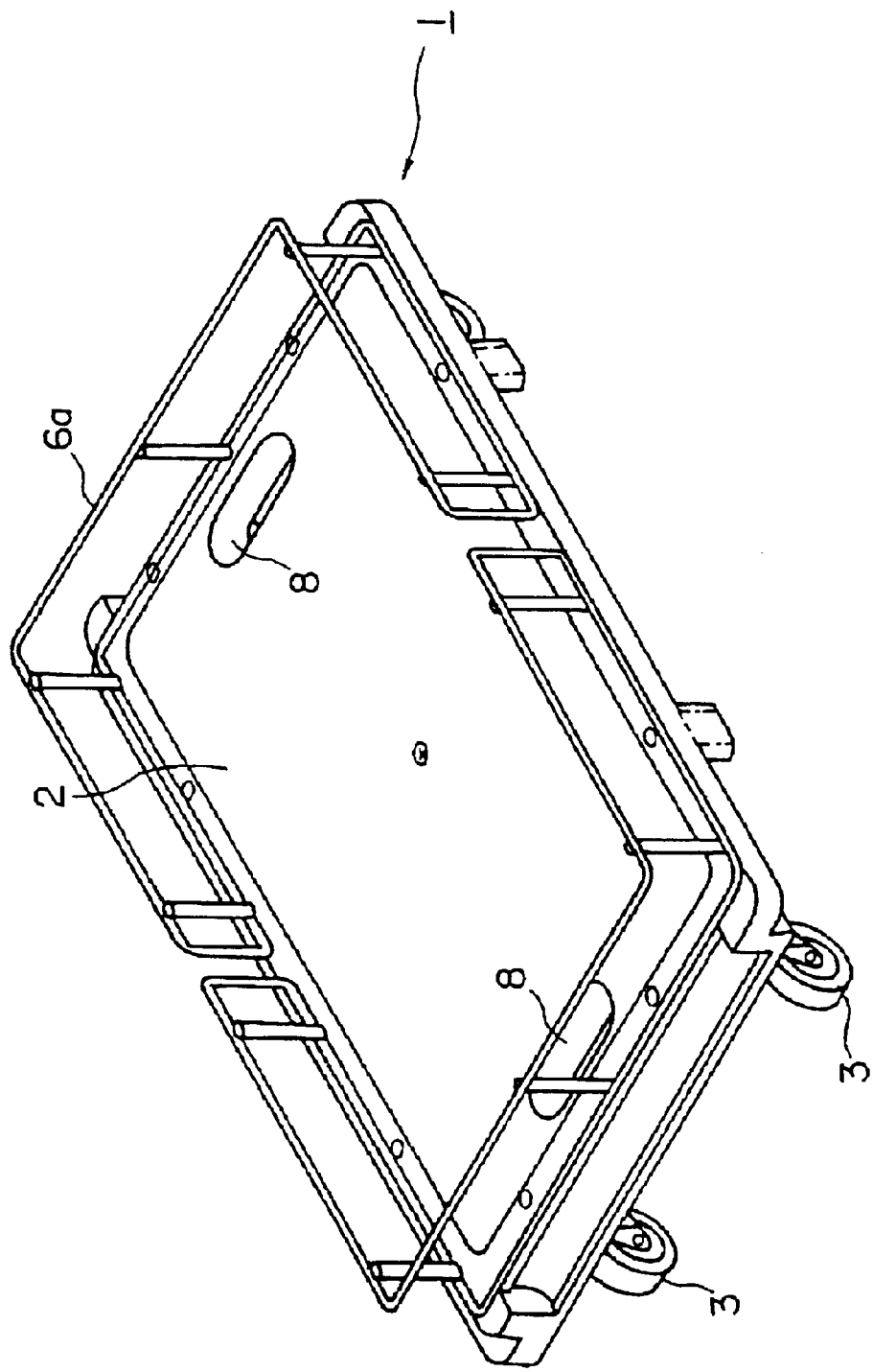
FIG. 12 is a perspective view showing one example of a goods overturn preventing member.

In FIG. 12, numeral 6a designates a goods overturn preventing member which is fitted to the cart 1 when the cart 1 is used singly. A leg portion of the goods overturn preventing member 6a is caused to engage detachably with an engaging hole 7 (see FIGS. 1 and 2) bored in an outer peripheral portion of the cart body 2. Overturn of the goods placed on the cart body 2 is thereby prevented.

Figure 13:
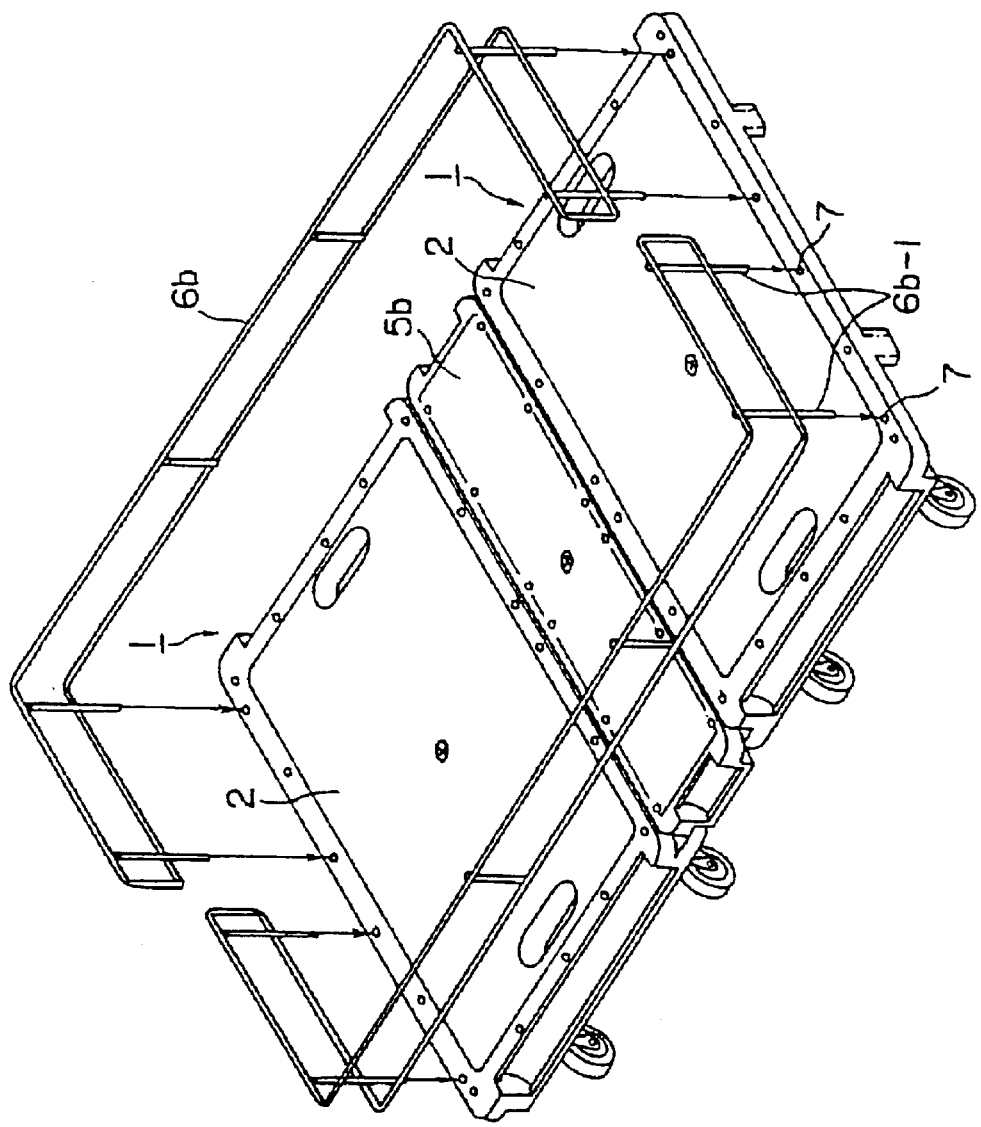
FIG. 13 is a perspective view showing another example of a goods overturn preventing member.
Figure 14:
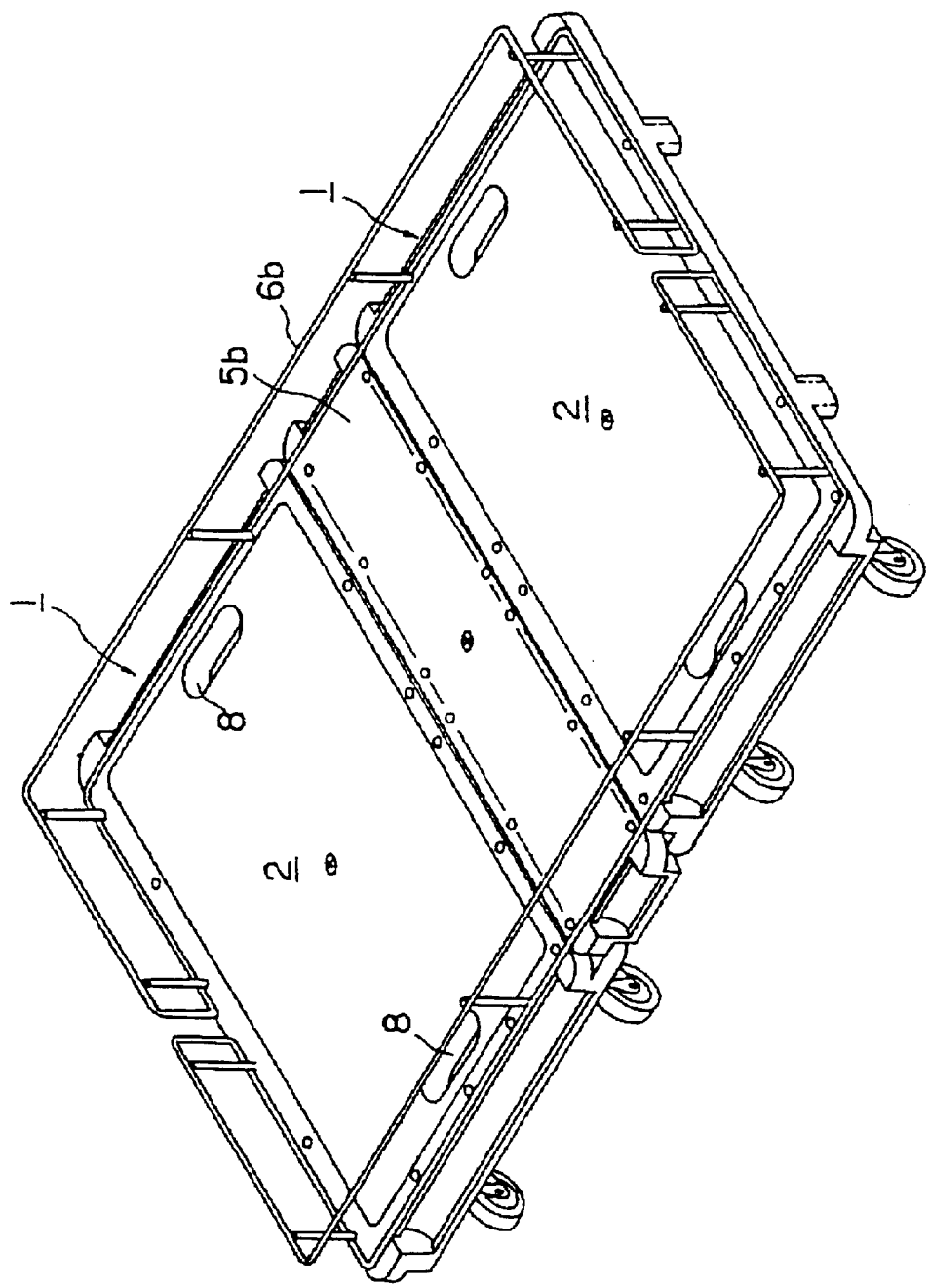
FIG. 14 is a perspective view showing a state where the goods overturn preventing member of FIG. 13 is mounted.

Numeral 6b in FIGS. 13 and 14 designates a goods overturn preventing member which is fitted to the carts 1 when two carts 1 are jointed together via the jointing member 5b. A leg portion 6b-1 of the goods overturn preventing member 6b is caused to engage detachably with an engaging hole 7 (see FIG. 9) bored in an outer peripheral portion of the cart body 2, and overturn of the goods placed on the cart body 2 is thereby prevented.

Next, a supermarket goods display method will be described concretely.

Figure 15:
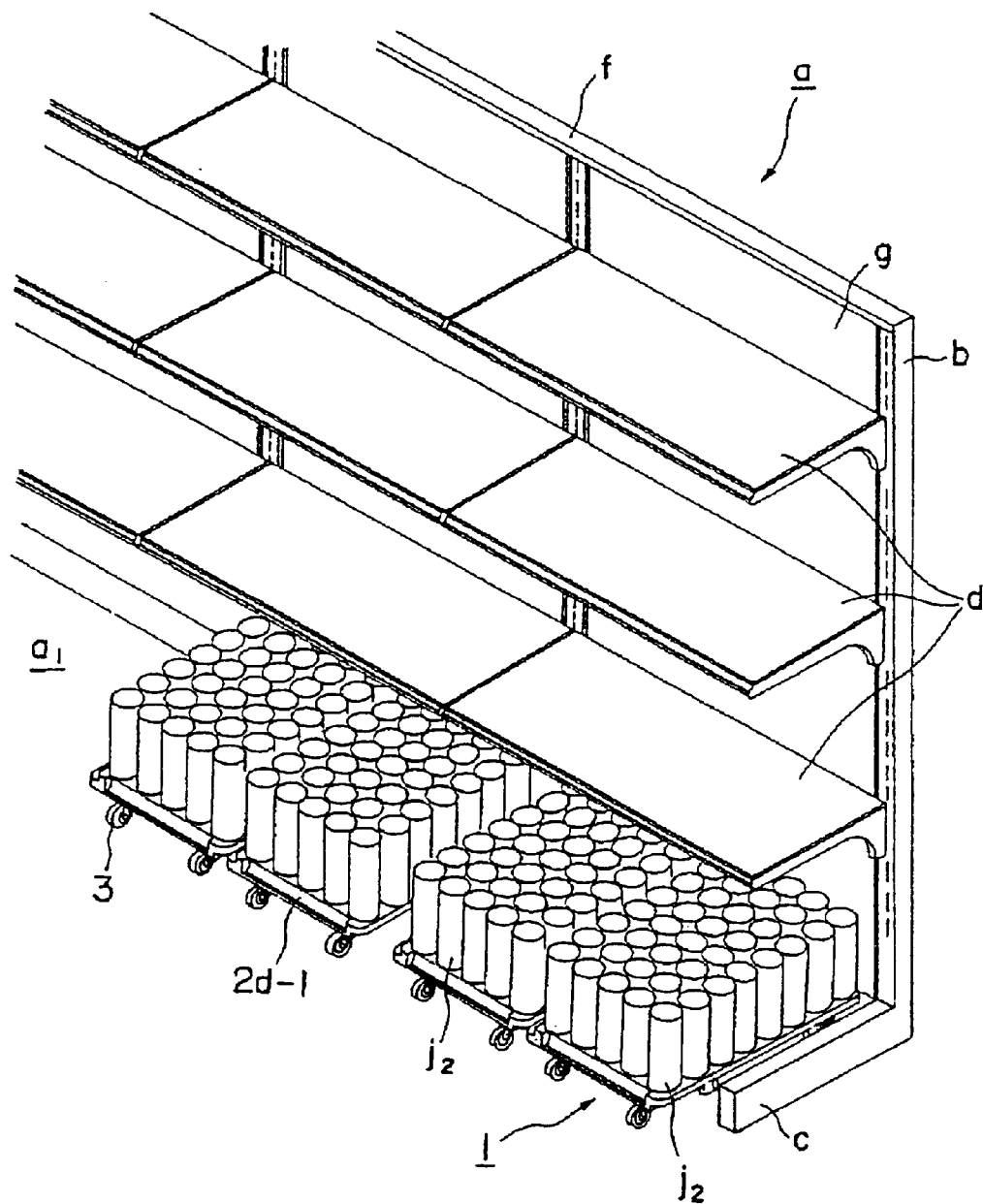
FIG. 15 is a perspective view showing a complete display state of goods.
Figure 26:
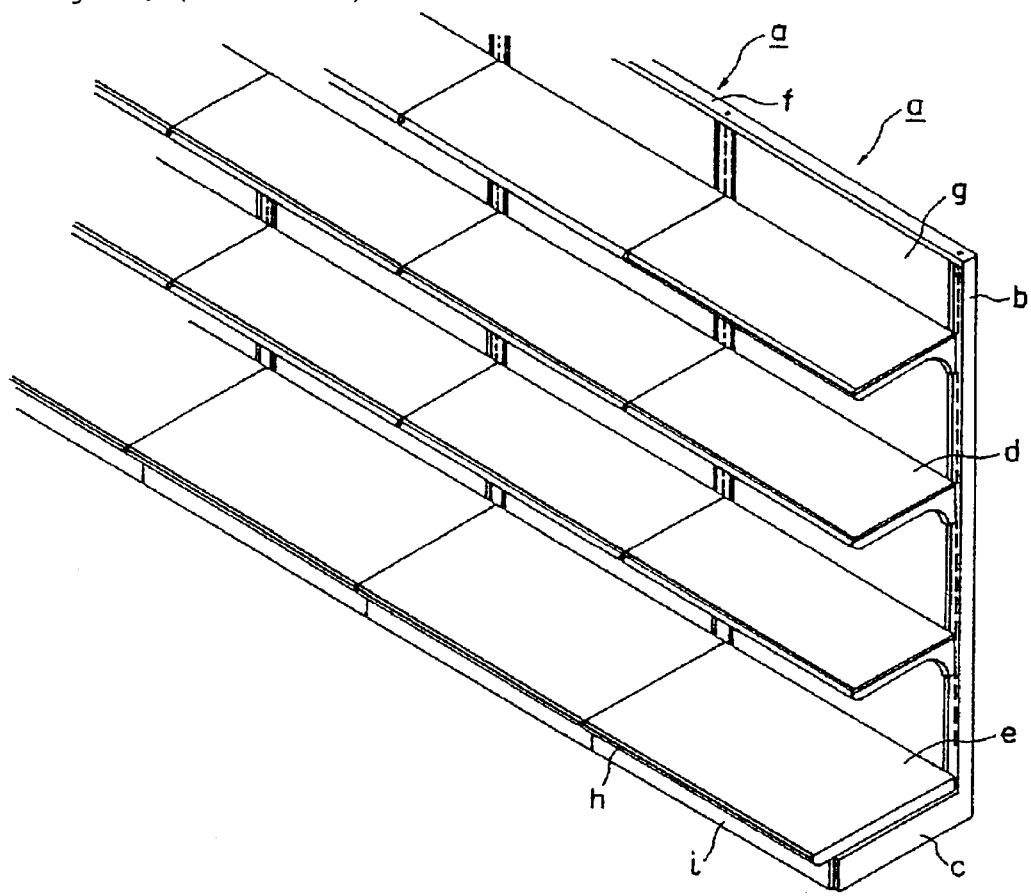
FIG. 26 is a perspective view showing a prior art supermarket goods display rack.
Figure 27:
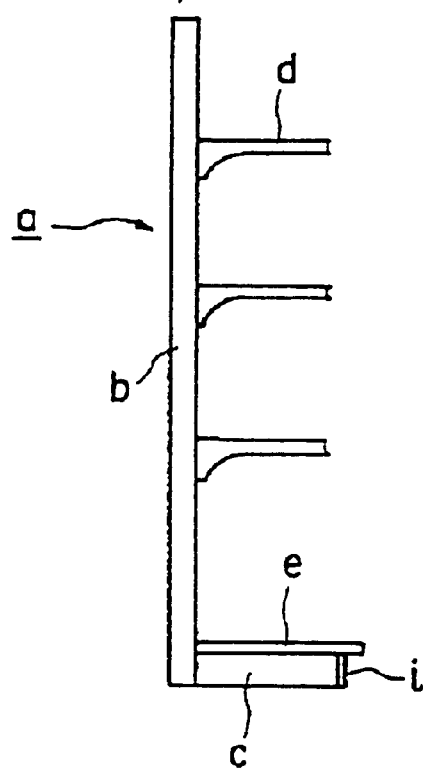
FIG. 27 is a side view of th e goods display rack of FIG. 26.

A base plate (see "e" of FIG. 26) of a supermarket goods display rack a is removed so as to form a passage $a_1$ for enabling a goods display cart 1 to come into and out of a base portion of the goods display rack a, as shown in FIG. 15.

While goods are being displayed, a plurality of goods display carts 1 are arrayed in the passage a, and a large number of goods $j_2$ placed thereon are displayed in a direction from a front side toward a rear side of the base portion. FIG. 15 shows a state of complete display. At this time, a price label rail 2d-1 is positioned on a front face of the base portion.

Figure 16:
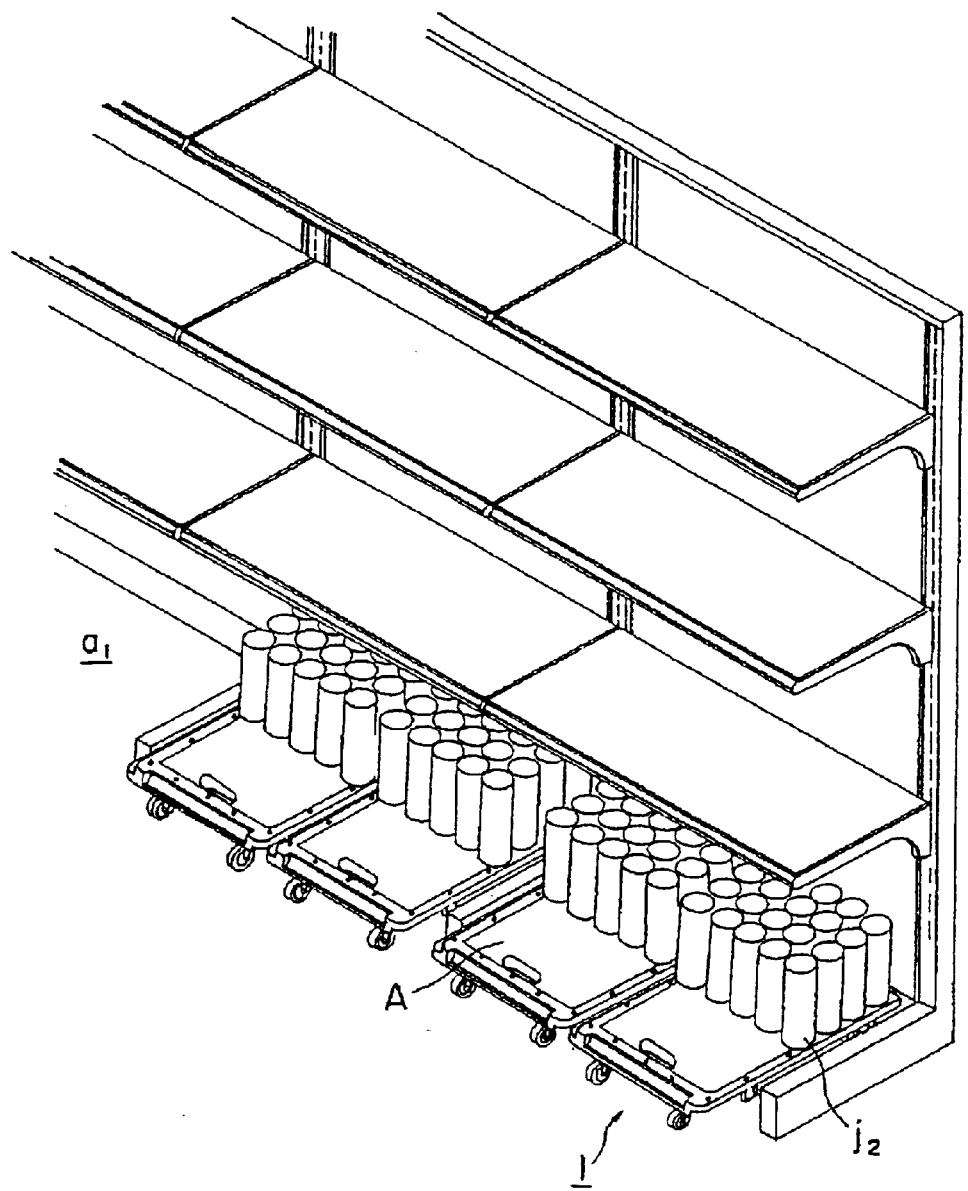
FIG. 16 is a perspective view showing a state where goods on a front side are sold out.

FIG. 16 shows a state where the goods $j_2$ of the front side are sold out to form a blank portion A at a front half portion of the goods display cart 1, and thus goods supplementing work becomes necessary.

Figure 17:
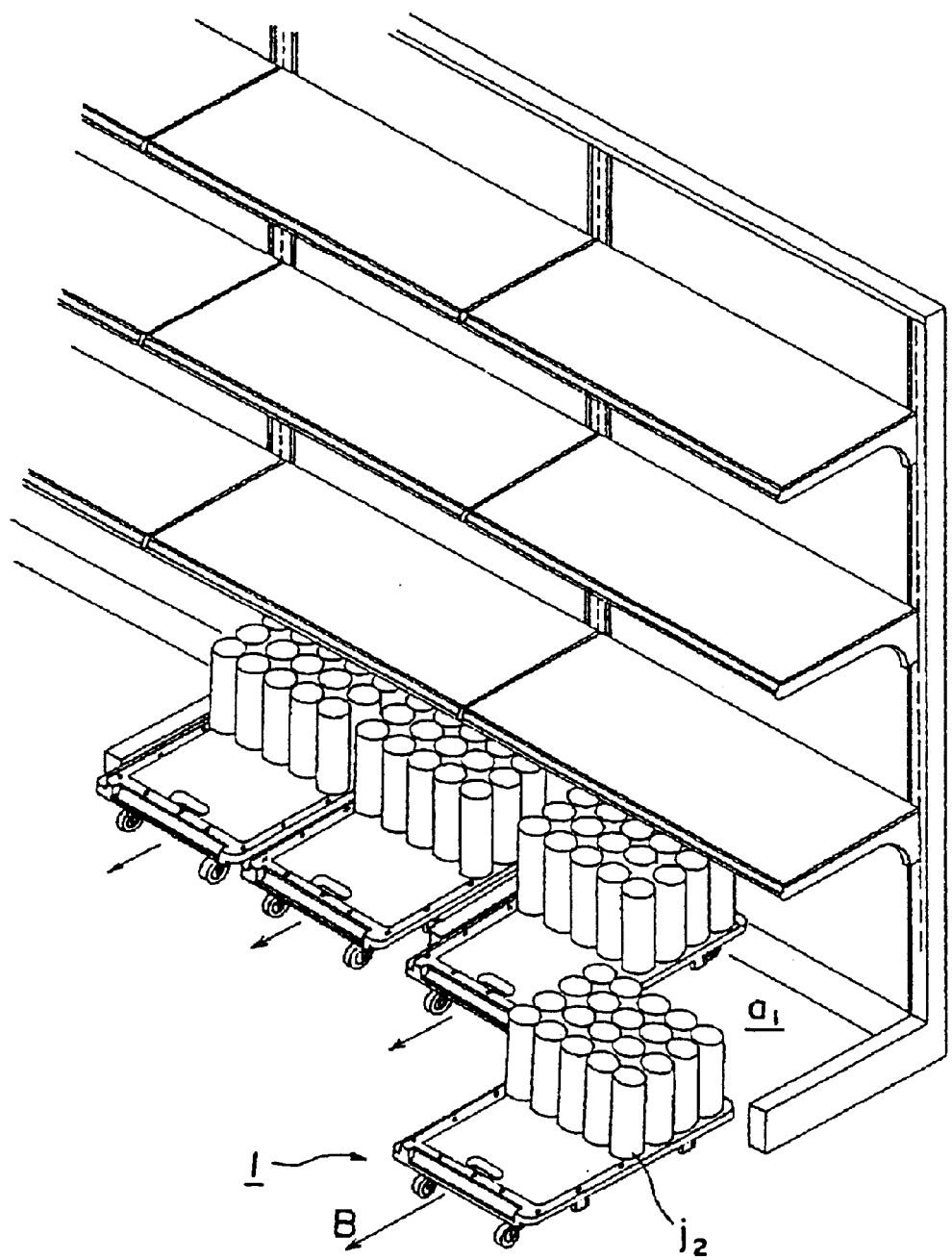
FIG. 17 is a perspective view showing a state where a goods display cart is drawn out of a base portion.
Figure 18:
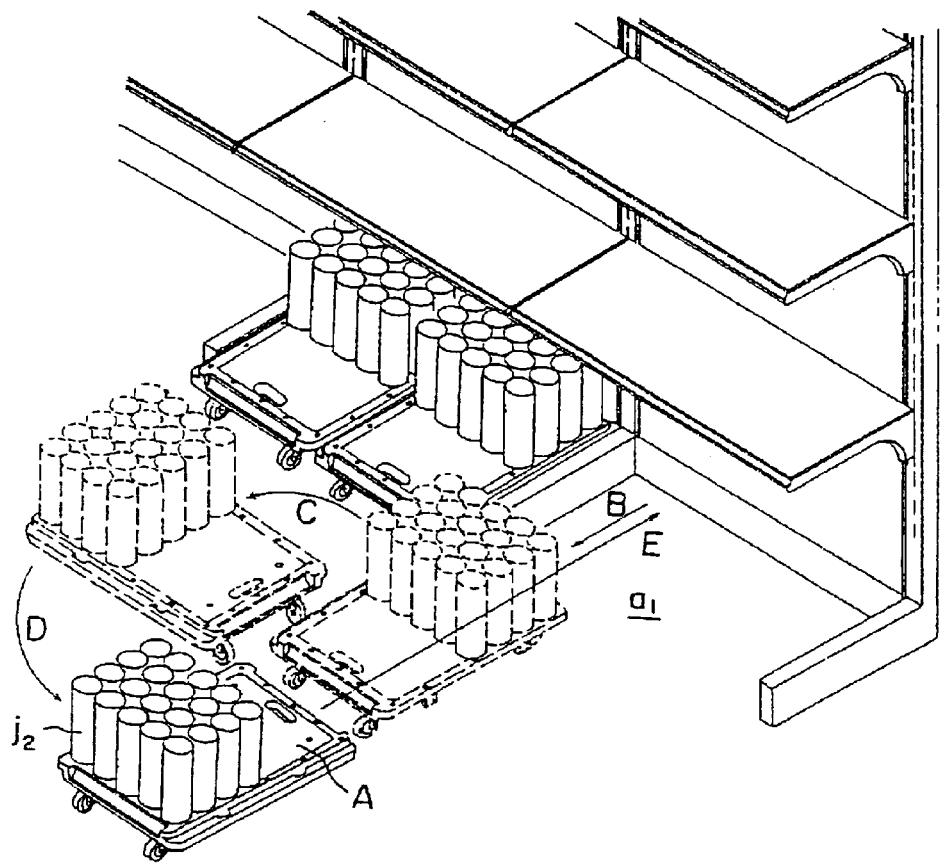
FIG. 18 is a perspective view showing a state where the goods display cart is turned around outside of the base portion.
Figure 19:
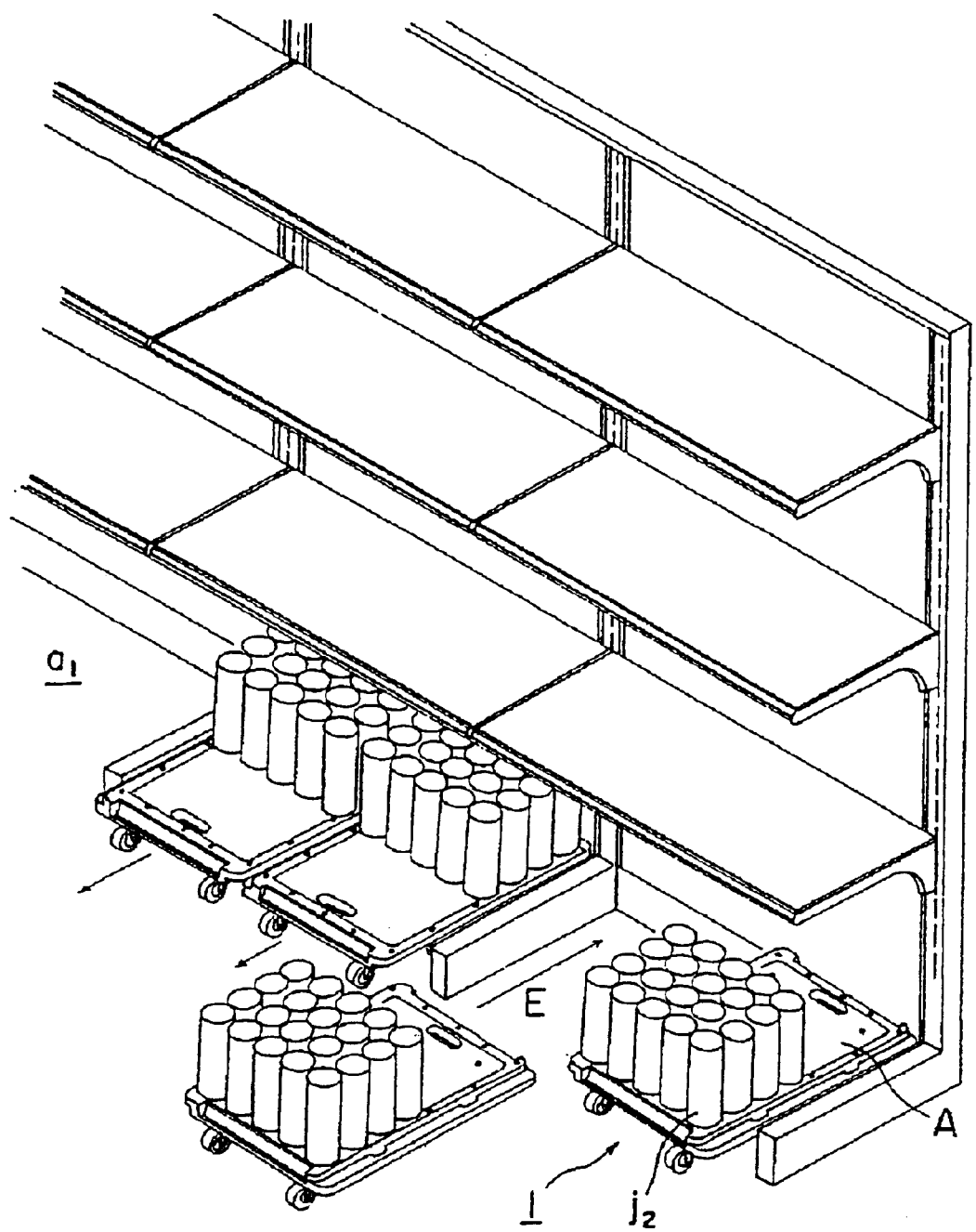
FIG. 19 is a perspective view showing a state where the goods display cart is returned to the base portion.

At this time, as shown in FIGS. 17 to 19, the goods display cart 1 is drawn out of the base portion while the remaining goods $j_2$ stay thereon (see arrow B), and then the goods display cart 1 is turned around (see arrows C and D) and pushed to return into the passage a, (see arrow E). Thus the goods $j_2$ remaining on the goods display cart 1 can be changed from the rear portion to the front portion of the base portion.

Figure 20:
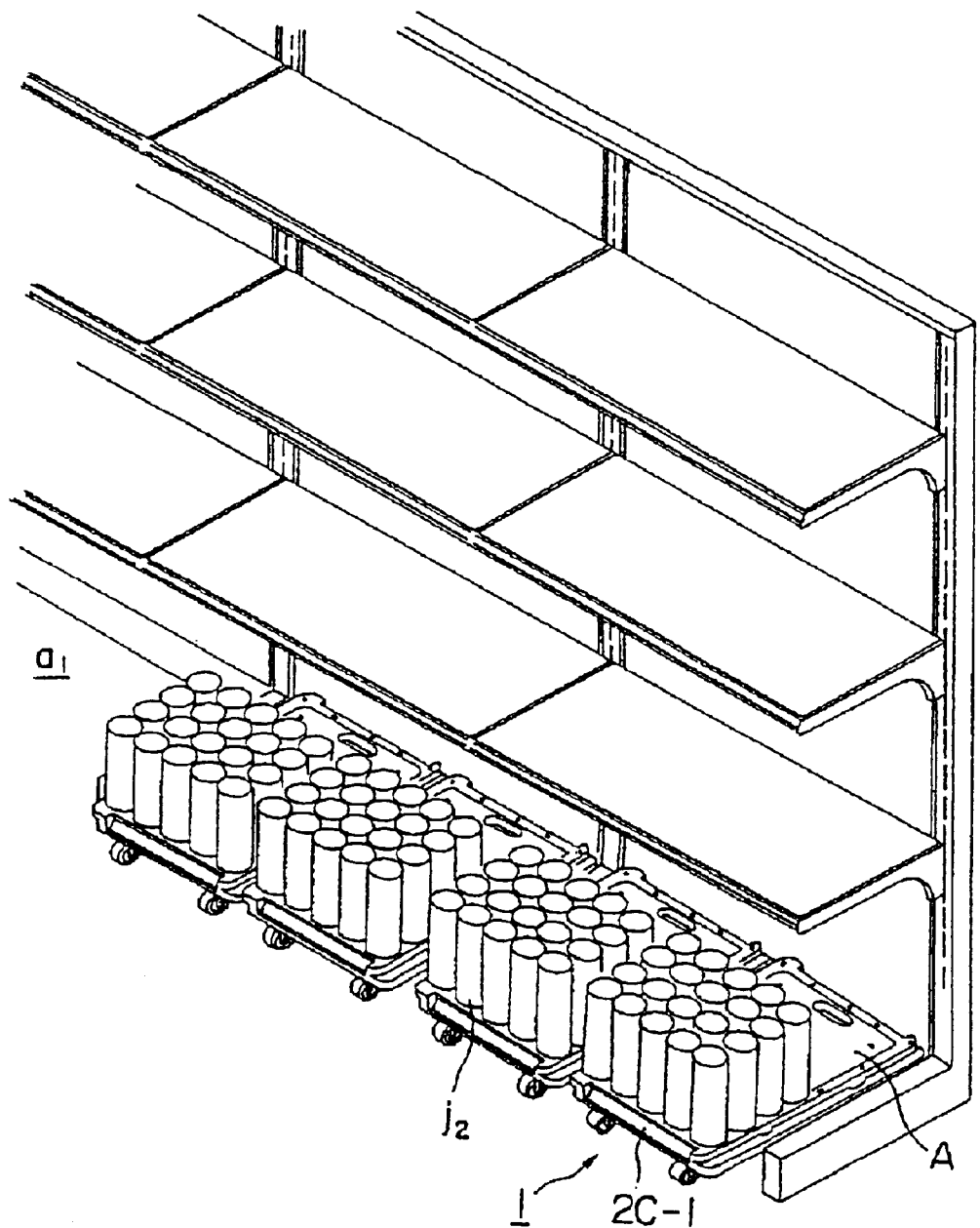
FIG. 20 is a perspective view showing a state where the goods display cart has been returned to the base portion.

FIG. 20 shows a state where the change work of the goods $j_2$ from the rear portion to the front portion of the base portion has been completed. At this time, a price label rail 2c-1 is positioned on the front face of the base portion.

Figure 21:
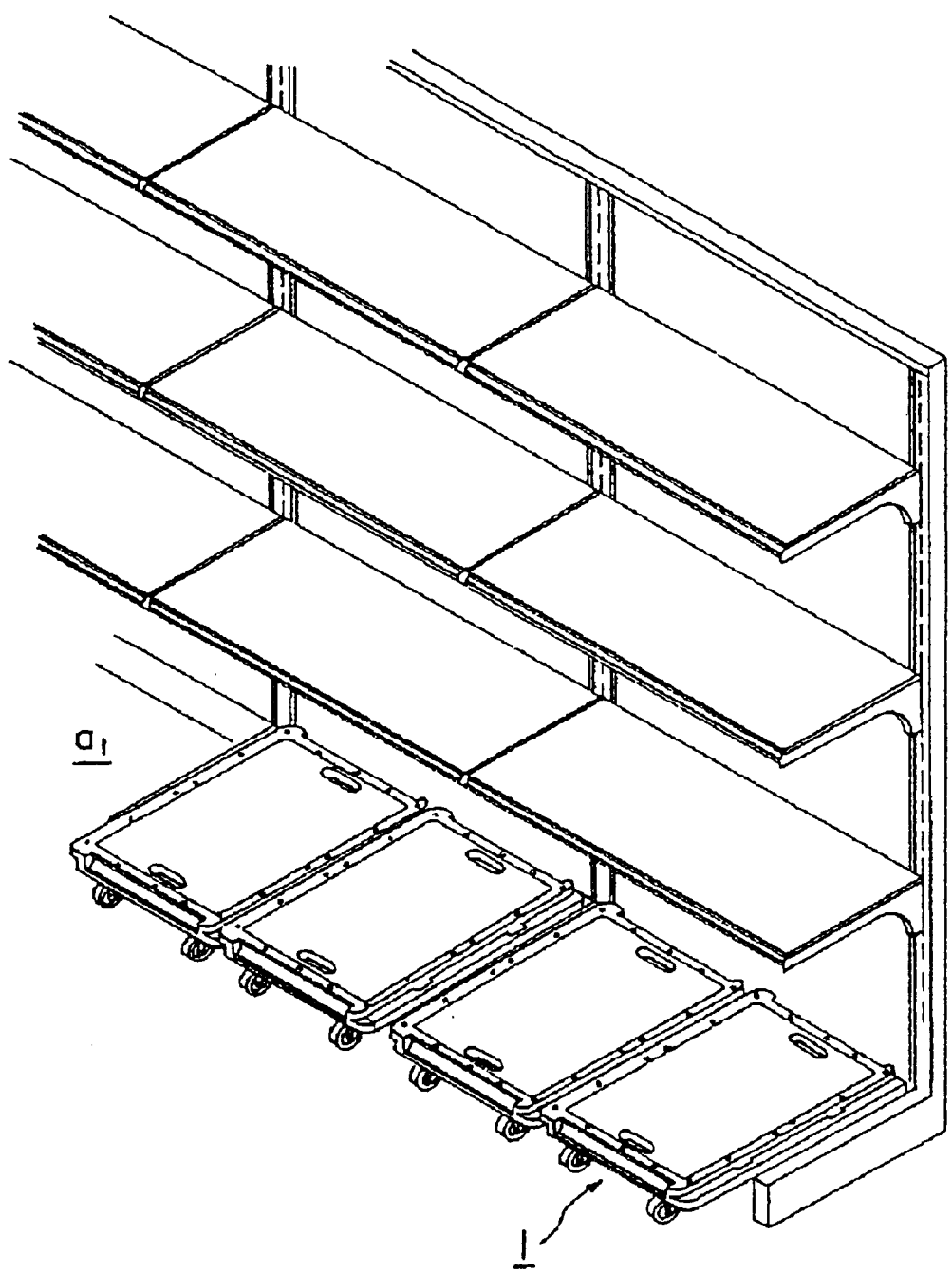
Figure 22:
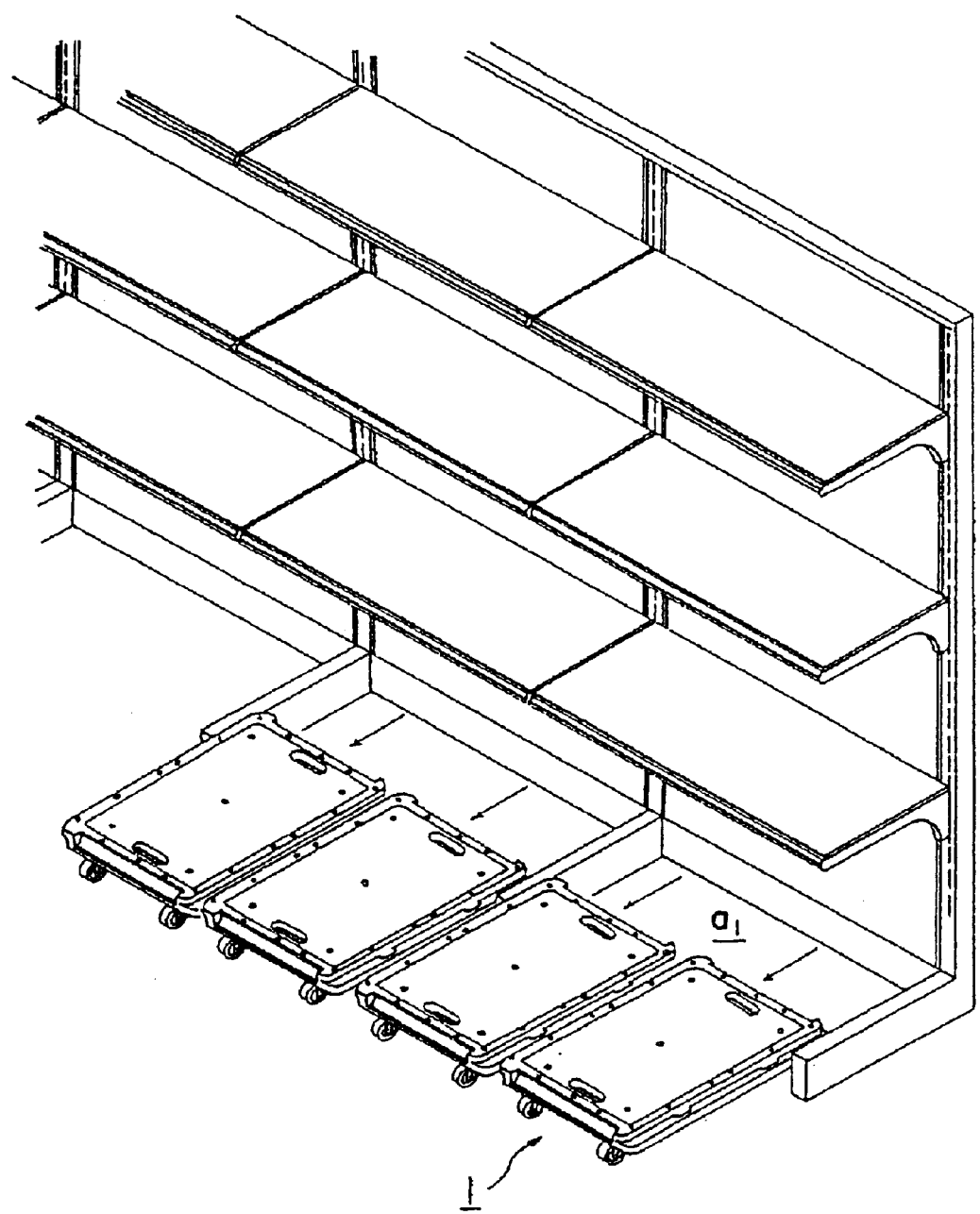
FIG. 22 is a perspective view showing a state where the goods display carts are being drawn out of the base portion for a goods supplementing work.
Figure 23:
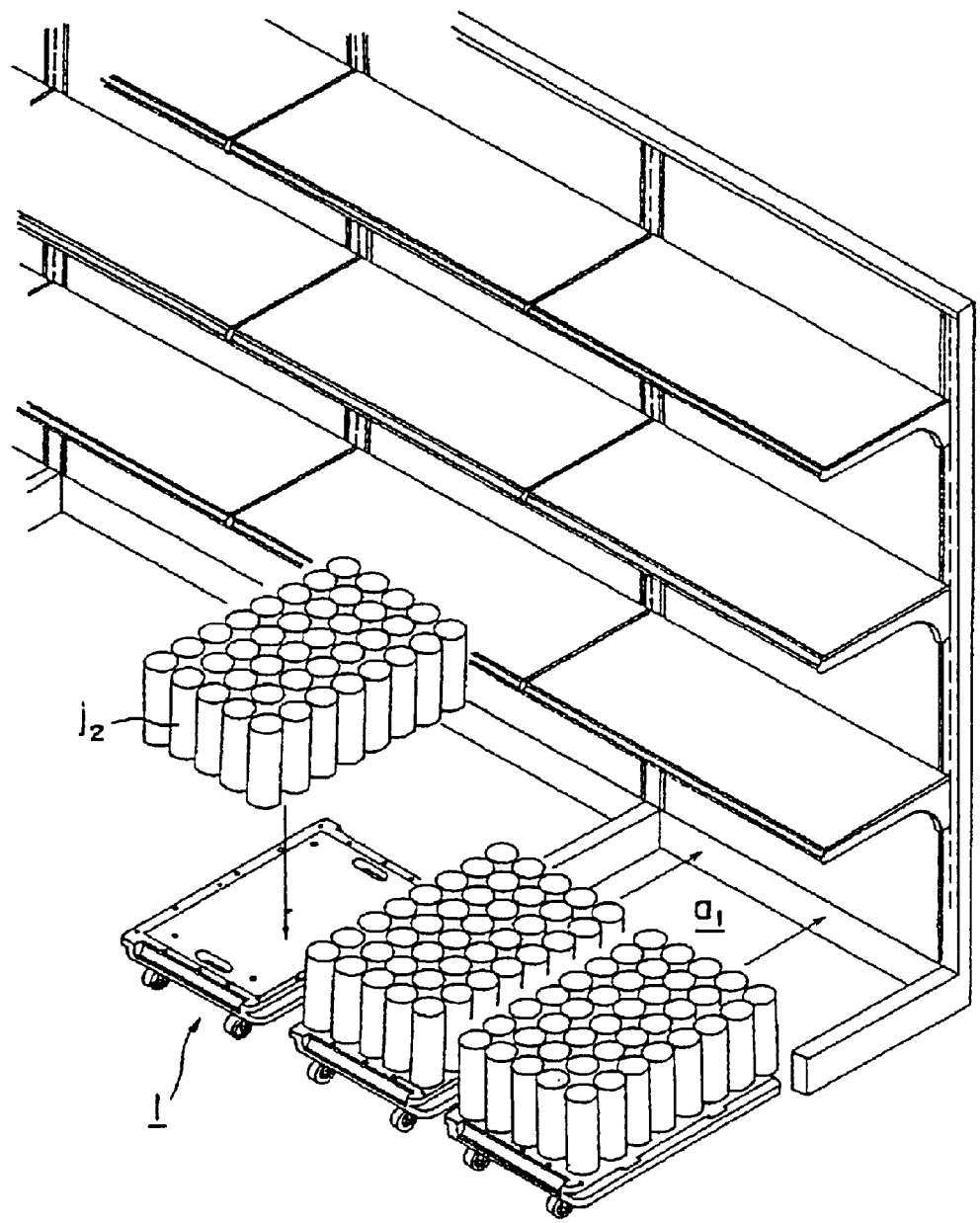
FIG. 23 is a perspective view showing a state where the goods supplementing work on the goods display cart is done wherein a work place therefor is outside of the base portion.

FIG. 21 shows a state where the goods $j_2$ are sold out and a goods supplementing work is being waited for, FIG. 22 shows a state where the goods display carts 1 are drawn out of the base portion for the goods supplementing work and FIG. 23 shows a state where the goods $j_2$ are placed on the goods display cart 1, wherein the goods supplementing work is done outside of the base portion. Thus, upon the goods $j_2$ being placed on the goods display cart 1, the goods display cart 1 is returned into the base portion.

Figure 24:
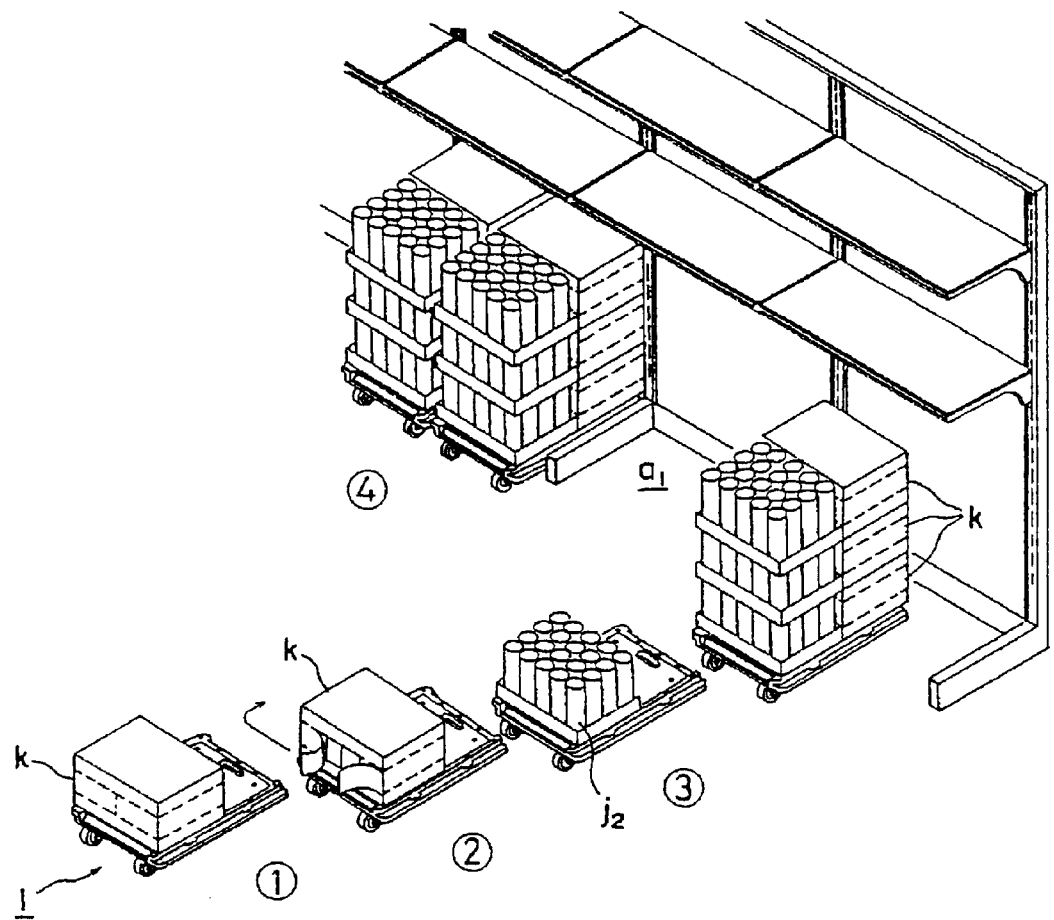
FIG. 24 is a perspective view showing a state where goods as packed in a package are being displayed.
Figure 25:
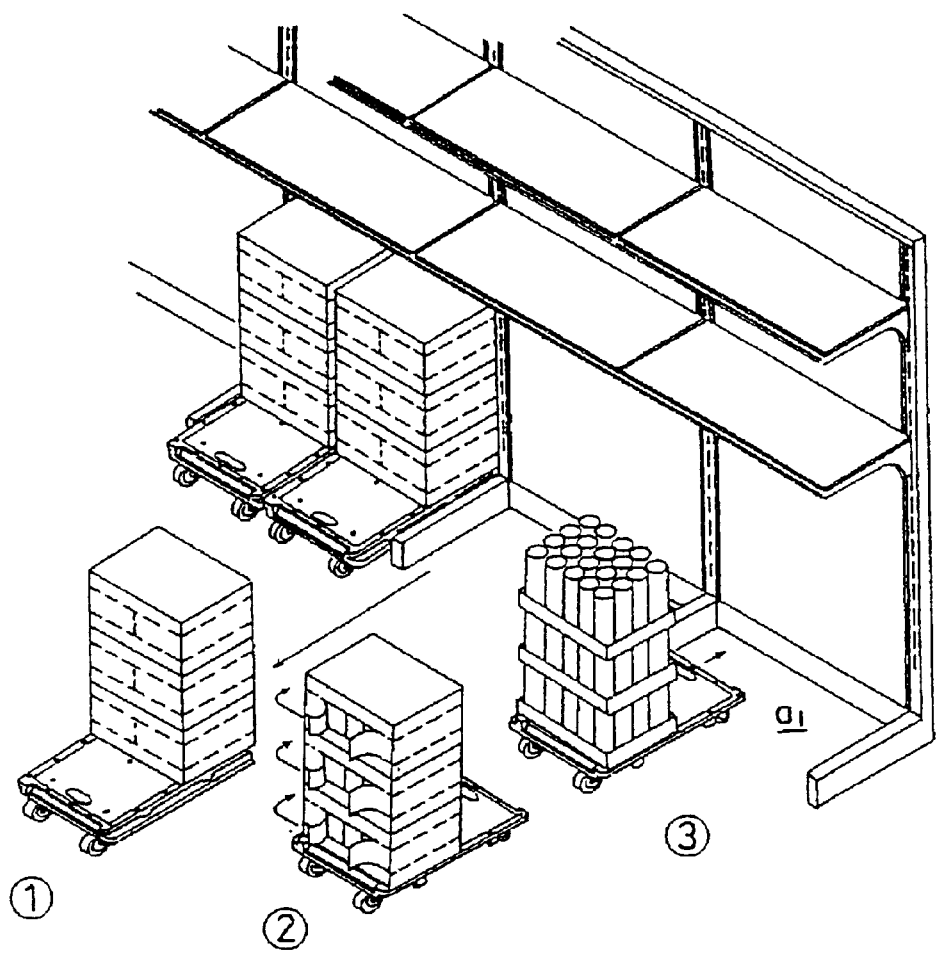
FIG. 25 is a perspective view showing a state where a cart having thereon remaining goods as packed in a package is drawn out of a passage in the base portion, turned around and returned into the passage.

FIGS. 24 and 25 show a case where the goods $j_2$, overlapped with one on another in three vertical stages, are displayed as they are packed in packages k. Two uppermost two shelf plates d only out of each of the shelf plate d of the goods display rack a remain, with other shelf plates d and the base plate e having been removed, so that the base portion is enlarged in the height.

In displaying the goods $j_2$, as shown in FIG. 24, the package k of the first stage or the lowermost stage is cut out in the order of ①→②→③ so that the goods $j_2$ as packed remain on a bottom portion of the package k. The packages k of the second and the third stages are likewise cut out and overlapped on one another in three stages on the front side of the goods display cart 1. On the other hand, the packages k not cut out but containing the goods $j_2$ are overlapped on one another in three stages on the rear side of the goods display cart 1, and then the goods display cart 1 is pushed into the base portion. This state of display is shown as ④ in FIG. 24.

When the goods $j_2$ on the front side are sold out, the goods display cart 1 is drawn out of the base portion at ① of FIG. 25 and is turned around at ② so that the packages k remaining on the goods display cart 1 come to the front side. Then the packages k are cut out so that the goods $j_2$ as packed remain on the bottom portion of each of the packages k and the goods display cart 1 is pushed into the base portion at ③. As to other goods display carts 1 also, the goods $j_2$ remaining on the carts 1 are likewise changed from the rear side to the front side of the base portion.

In the case of FIGS. 24 and 25 as described above, the goods $j_2$ are overlapped one on another nearly as high as the height of eyes of shoppers, hence the existence of the goods $j_2$ can be noticed by the shoppers.

According to the supermarket goods display method of the present invention, the method comprises forming a passage within a base portion of a goods display rack; placing a goods display cart into the passage, the cart displaying thereon a plurality of goods in a direction from a front side toward a rear side of the base portion, when the goods on the front side of the base portion on the cart are sold out, drawing the cart out of the passage of the base portion, as the cart has the goods remaining thereon, turning the cart around, and returning the cart into the passage, thereby changing the goods remaining on the cart from the rear side to the front side of the base portion. Thus, the changing work of the goods from the rear side to the front side of the base portion can be done easily even by women workers.

Also, according to the supermarket goods display method of the present invention, the method comprises forming a passage within a base portion of a goods display rack, placing a goods display cart into the passage, the cart displaying thereon a plurality of goods in a direction from a front side toward a rear side of the base portion, when the goods on the front side of the base portion on the cart are sold out, drawing the cart out of the passage of the base portion, as the cart has the remaining goods thereon, placing new goods on the front side of the goods remaining on the cart, turning the cart around and returning the cart into the passage, thereby changing the goods remaining on the cart from the rear side to the front side of the base portion as well as adding new goods on the rear side of the base portion. Thus, the supplementing work of new goods from outside of the base portion to the rear side of the base portion can be done easily even by women workers.

Further, according to the supermarket goods display rack device of the present invention, the above-mentioned goods display method of the present invention can be practiced efficiently.

Also, according to the goods display cart of the present invention having a bedplate-like cart body for carrying goods thereon, it comprises: a caster fitted to a lower face of each corner portion of the cart body and an auxiliary caster fitted to a lower face of a central portion of the cart body as a result the following effect can be obtained. That is, in case the cart body is integrally formed of plastics and is alleviated of weight for easy carrying of the goods display cart when it is not used, when a large number of goods are placed so as to vertically overlap in upper and lower stages, or weighty goods are placed on the cart so that a large load is added to the cart, then the cart body bends as shown in FIGS. 5(a) and (b), and the vertical slewing spindle of the caster inclines relative to the floor face so that the goods display cart looses its smooth movement, if the caster is fitted only to the lower face of each of the corner portions of the cart body. On the contrary, in the present invention, because the auxiliary caster is fitted to the lower face of the central portion of the cart body, the downward deformation of the cart body can be prevented and the state of FIGS. 5(c) and (d) can be maintained.

Also, in the goods display cart of the present invention, the cart body has price label rails at its front and rear portions, respectively. The price label rails are formed of a synthetic resin material integrally with the cart body, whereby there is no need manufacture the price label rail separately and fit it to the cart body which results in reduction of manufacturing cost in addition to cost reductions due to integral forming by plastics of the cart body. Also, because the price label rails are provided both on the front side and rear side of the cart body, even if the front side and the rear side of the goods display cart may be changed with each other by turning the cart, the goods name etc. can always be displayed always on the front face of the cart body.

Also, the goods display cart of the present invention further comprises jointing members of plural kinds having different widths. Each the jointing member has a jointing hook on each side. The cart body has an upper edge portion projecting sidewardly from its one side upper portion and a jointing hook provided to a lower face of the upper edge portion as well as a lower edge portion projecting sidewardly from its other side lower portion and a jointing hole formed in the lower edge portion, whereby the following effect can be attained. That is, there are different widthwise dimensions of the goods display rack (on the base portion) according to each supermarket, and corresponding thereto, there is a need to make the size of the goods supporting surface of the goods display cart changeable. According to the goods display cart of the present invention as so constructed, every way of use of the single cart, the carts jointed together sideways or the carts jointed together sideways via one jointing member selected from a plurality of kinds of jointing members, each different in lateral width, is possible, and the size of the goods supporting surface of the goods display cart can be changed so as to correspond to the widthwise dimension of the goods display rack (on the base portion).

Also, in the goods display cart of the present invention, the jointing member has an auxiliary caster fitted to a lower face of its central portion, whereby following effect can be attained. That is, in the state where the carts are jointed via the jointing member, if a large load is added there to such that a large number of goods are placed vertically thereon weighty goods are placed thereon, then the jointing member is pushed down and the jointing portions of the carts on both sides thereof are also pushed down, so that the carts on both sides incline around the casters on the jointing member side as shown in FIG. 11(a) and the vertical slewing spindle of each caster inclines, with the result that the goods display carts do not move smoothly. But because the auxiliary caster is provided to the lower face of the central portion of the jointing member, the downward deformation of the jointing member is prevented and the jointing member and the goods display carts can be maintained in the state shown in FIG. 11(b).

Also, in the goods display cart of the present invention. The jointing member has a price label rail at its front and rear portions, respectively. The price label rails are integrally formed of a synthetic resin material with the jointing member, so there is no need to manufacture the price label rail separately and fit it to the jointing member. This results in a reduction of the manufacturing cost in addition to the cost reduction due to integral forming by plastics of the jointing member. Also, because the price label rail is provided both on the front side and the rear side of the jointing member, even if the front side and the rear side of the jointing member may be changed with each other by turning the goods name, etc., can always be displayed on the front face of the jointing member.

Also, the goods display cart of the present invention further comprises a goods overturn preventing member that engages detachably with an engaging hole provided in an outer peripheral portion of the cart body, whereby overturning of the goods placed on the bedplate-like cart body can be securely prevented.

While the invention has been described in its preferred embodiments, it is to be understood that modifications will occur to those skilled in the art without departing from the spirit of the invention. The scope of the invention is therefore to be determined solely by the appended claims.

What is claimed is:

1. A supermarket goods display rack device, comprising:
   a goods display rack having a base portion and an empty space at said base portion; and
   a goods display cart that can be moved into and moved out of the empty space at said base portion of the goods display rack;
   wherein said goods display cart comprises:
   a cart body comprising a bedplate, said cart body having a lower face, an upper face for carrying goods thereon, four corner portions and a central portion at a center of said lower face and centered with respect to said four corner portions;
   a caster fitted to each of said corner portions on said lower face of said cart body; and
   an auxiliary caster fitted to said lower face at said central portion of said cart body;
   wherein said cart body further comprises a front portion, a rear portion and price label rails at both said front portion and said rear portion, said price label rails being formed of a synthetic resin material integral with said cart body;
   further comprising at least two jointing members having different widths, wherein:
   each of said at least two jointing members comprises jointing hooks on laterally opposite sides thereof;
   said cart body comprises an upper edge portion that projects laterally from an upper portion of one side of said cart body, the upper edge portion having a lower face and a jointing hook extending from said lower face;
   said cart body comprises a lower edge portion that projects laterally from a lower portion of another side of said cart body opposite to the one side of said cart body, said lower edge portion having a jointing hole formed therein;
   whereby one of said at least two jointing members can connect with said jointing hole of said lower edge portion of said cart body with one of said jointing hooks on one of the laterally opposite sides thereof to enable connection with another cart body, and said jointing hook of said lower face of said upper edge portion of said cart body can connect with a jointing hole of another cart body.

2. The supermarket goods display rack device of claim 1, wherein one of said at least two jointing members comprises a lower face having a central portion and an auxiliary caster fitted to said central portion of the lower face.

3. The supermarket goods display rack device of claim 1, wherein one of said at least two jointing members comprises front and rear portions and price label rails formed of a synthetic resin material integrally with the one of said at least two jointing members on said front and rear portions thereof.

4. The supermarket goods display rack device of claim 1, and further comprising a goods overturning preventing member that is detachably engaged with at least one engaging hole located in an outer peripheral portion of the cart body.

5. A goods display cart arrangement, comprising:
   a cart body comprising a bedplate, said cart body having a lower face, an upper face for carrying goods thereon, four corner portions and a central portion at a center of the lower face and centered with respect to said four corner portions;
   a caster fitted to each of said corner portions on said lower face of said cart body; and
   an auxiliary caster fitted to said lower face at the central portion of said cart body;
   wherein said cart body further comprises a front portion, a rear portion and price label rails at both said front portion and said rear portion;
   further comprising at least two jointing members having different widths, wherein:
   each of said at least two jointing members comprises jointing hooks on laterally opposite sides thereof,
   said cart body comprises an upper edge portion that projects laterally from an upper portion of one side of said cart body, the upper edge portion having a lower face and a jointing hook extending from said lower face;
   said cart body comprises a lower edge portion that projects laterally from a lower portion of another side of the cart body opposite to the one side of said cart body, said lower edge portion having a jointing hole formed therein;

whereby one of said at least two jointing members can connect with said jointing hole of the lower edge portion of said cart body with one of said jointing hooks on one of the laterally opposite sides thereof to enable connection with another cart body, and said jointing hook of said lower face of said upper edge portion of said cart body can connect with a jointing hole of another cart body.

6. The goods display cart arrangement of claim 5, wherein one of said at least two jointing members comprises a lower face having a central portion and an auxiliary caster fitted to said central portion of said lower face.

7. The goods display cart arrangement of claim 5, wherein one of said at least two jointing members comprises front and rear portions and price label rails formed of a synthetic resin material integrally with the one of said at least two jointing members on said front and rear portions thereof.

8. The goods display cart arrangement of claim 5, and further comprising a goods overturning preventing member that is detachably engaged with at least one engaging hole located in an outer peripheral portion of said cart body.

* * * * *